United States Patent

[11] 3,567,048

| | | | | |
|---|---|---|---|---|
| [72] | Inventor | Latham E. Whitham<br>11 Santa Rita St., Hurley, N. Mex. 88043 | 3,057,488 10/1962 Atkinson | 214/17(.62) |
| [21] | Appl. No. | 865,257 | 3,237,807 3/1966 Garvey | 198/186X |
| [22] | Filed | Oct. 10, 1969 | | |
| [45] | Patented | Mar. 2, 1971 | | |
| | | Continuation-in-part of Ser. No.<br>596,976, Nov. 25, 1966, Patent No.<br>3,477,593. | | |

*Primary Examiner*—Robert G. Sheridan
*Attorneys*—John L. Sniado and Jones & Lockwood

[54] REMOTE AUTOMATIC TRIPPER OPERATION AND CONTROL BY LOW BIN DETERMINATION
19 Claims, 14 Drawing Figs.

[52] U.S. Cl. .................................................. 214/16, 198/186
[51] Int. Cl. .................................................. B65g 47/19, B65g 65/74
[50] Field of Search .................................................. 214/16, 17.62; 198/186

[56] References Cited
UNITED STATES PATENTS
2,097,909 11/1937 Atz .............................. 214/16X ABSTRACT: A tripper control system for regulating the flow of material from a conveyor into selected side-by-side bin locations is disclosed. The tripper is adapted to move under external program control in normal conditions to provide spot discharge of the conveyor over a predetermined low bin. The program control system includes means for periodically monitoring the level of each bin and directing the tripper to the lowest bin, where it remains until the next program cycle. A safety override responds to an overfull condition in the bin being filled to switch the tripper to self control, whereby it is moved to the next bin that is less than full and an alarm is sounded. The tripper remains in the self control mode until an operator returns it to program control or places it on manual control. In the event of control failure emergency switching shuts down the tripper and the conveyor.

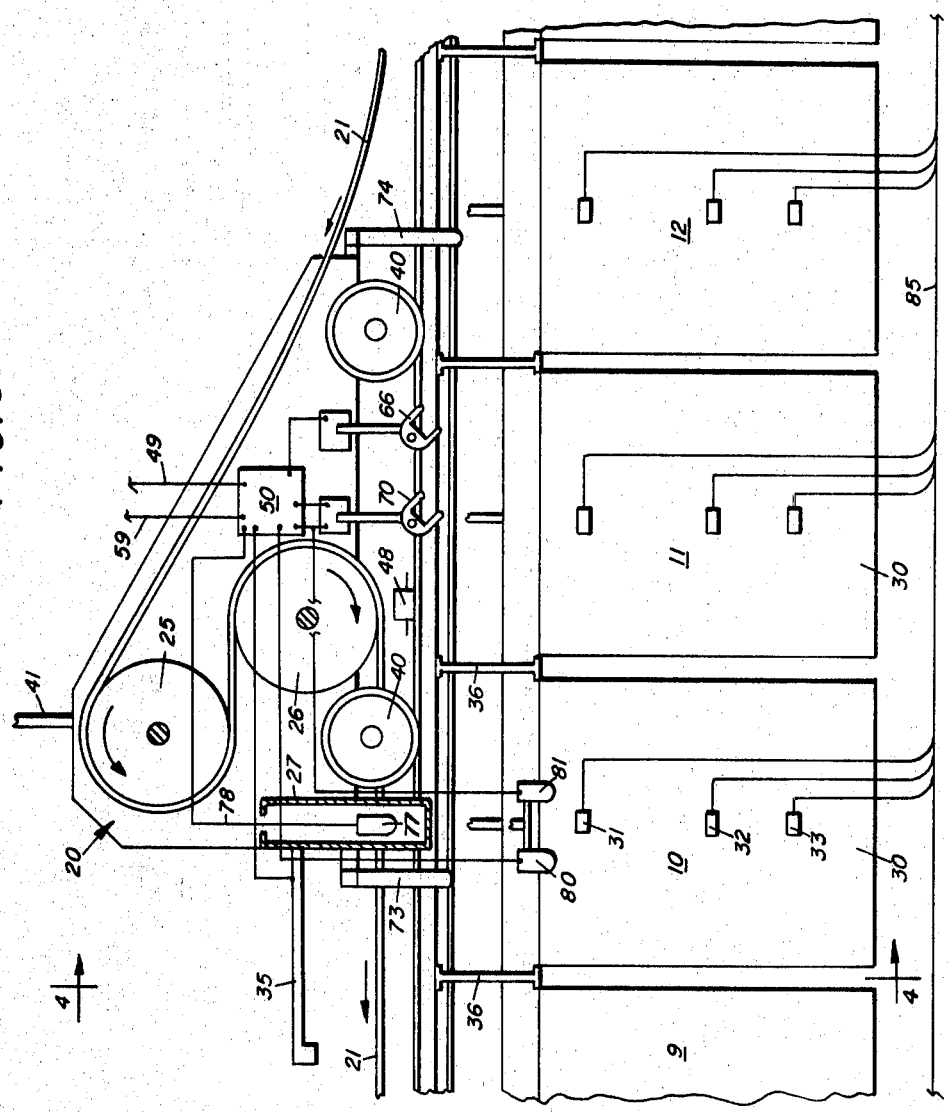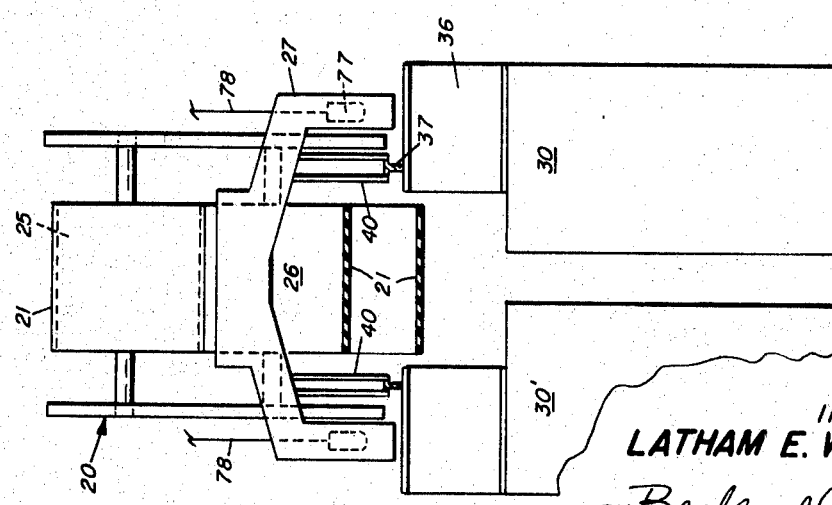

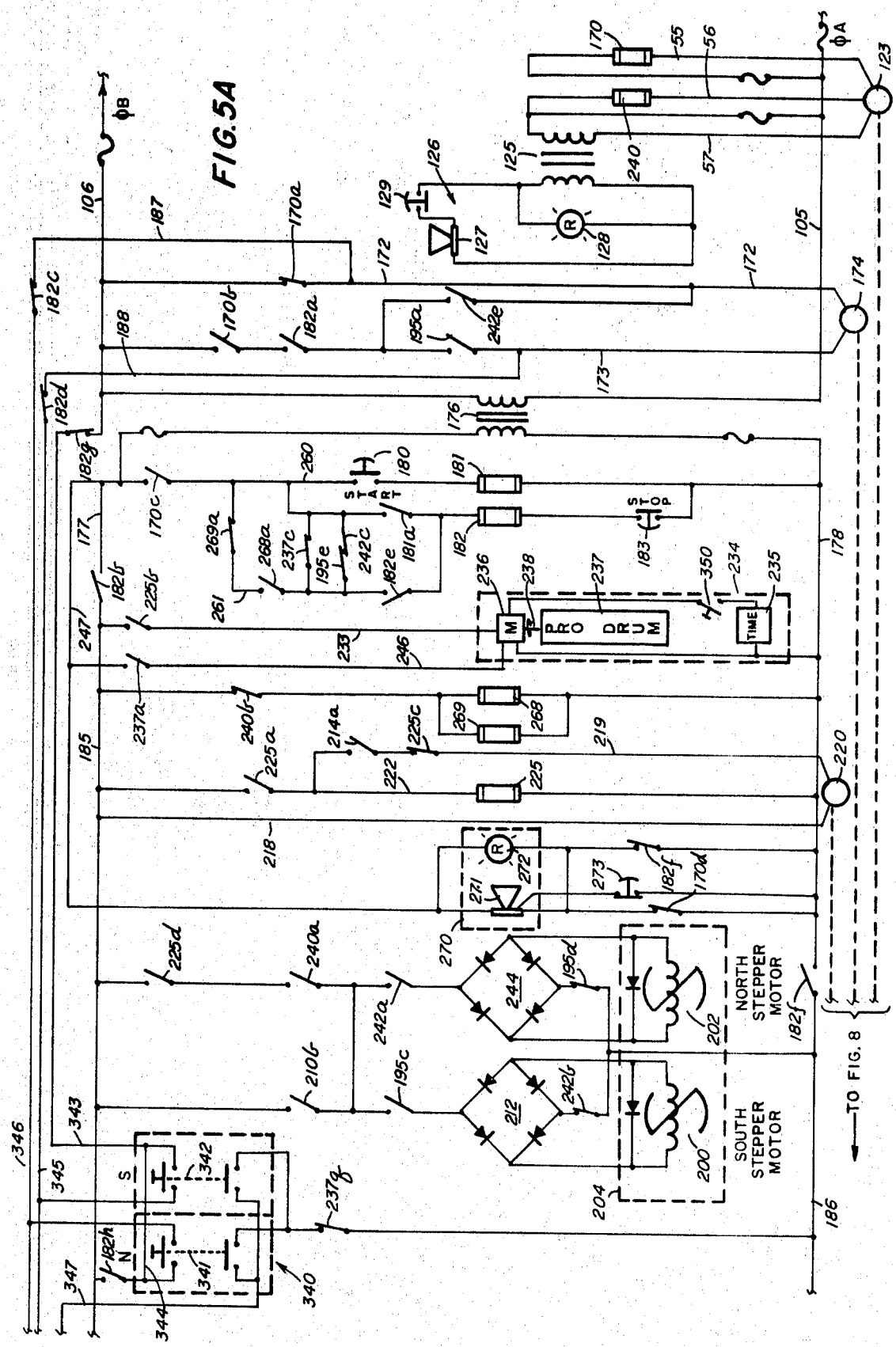

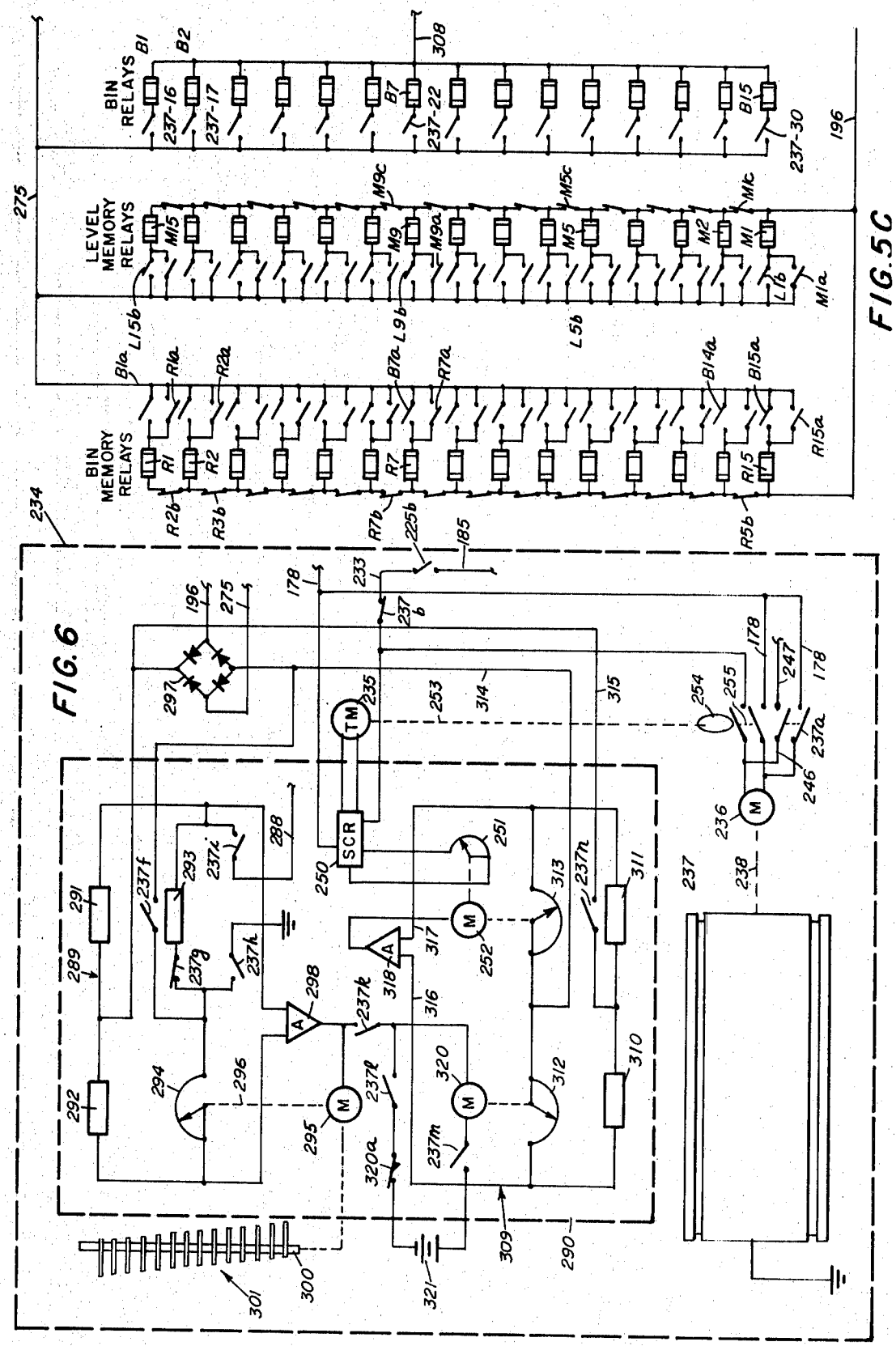

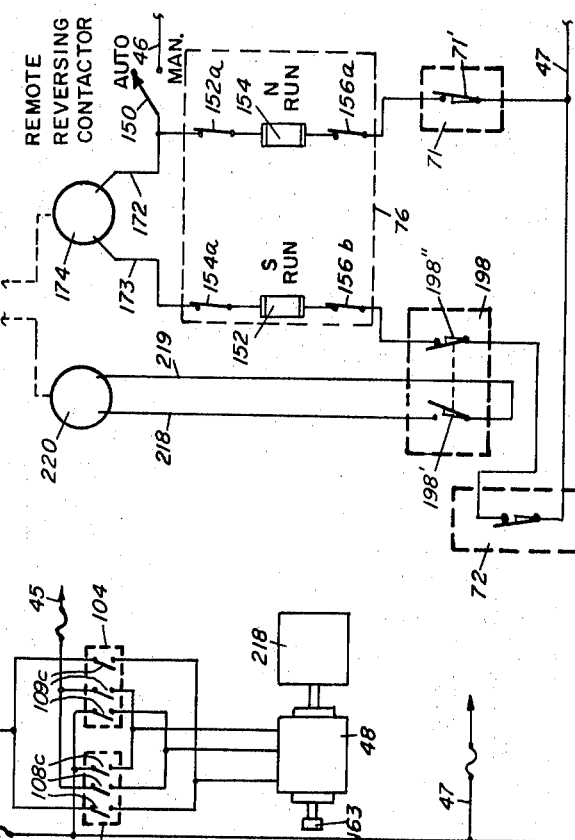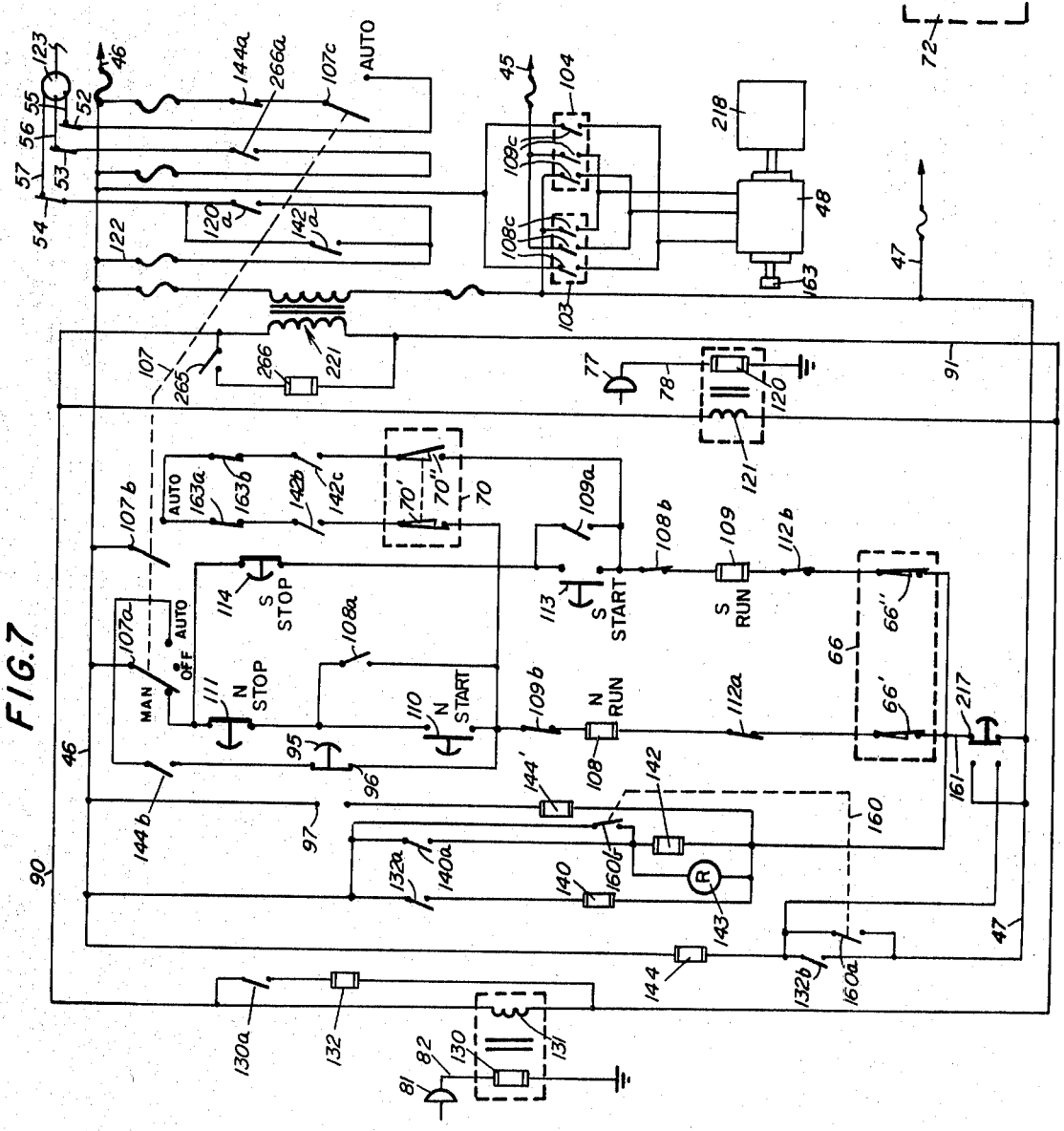

FIG.11

NO.1 TRIPPER

CHOICE — 128
TRIPPER CONTROL FAILURE

UNITS 1 2 3 4 5 6 7 8 9 10 11 12 13 14 15
8
7
6
5
4
3
2
1
0

BIN-LEVEL READ-OUT — 286

TRIPPER POSITION INDICATOR — 230, 227

127 — START 180
129 SPOT-NORTH   PROG MAN — 350
341   STOP 183
       SPOT-SOUTH
       342 — 273

FIG.10

| 5C | 5B | 5A |

FIG.12

REMOTE AUTOMATIC TRIPPER OPERATION AND CONTROL BY LOW BIN DETERMINATION

BACKGROUND OF THE INVENTION

This application is a continuation-in-part of copending application Ser. No. 596,976, filed Nov. 25, 1966 entitled "Automatic Remote Tripper Control", and assigned to the assignee of the present application. This prior application issued on Nov. 11, 1969 as U.S. Pat. No. 3,477,593.

The present invention relates to a movable tripper for a conveyor belt and to a control system for providing a programmed mode of operation for the tripper. More particularly, this invention relates to a tripper for discharging a conveyor belt into an elongated storage area that is subdivided into a plurality of separate bins, the tripper being under remote control of a programmer which permits the material discharged from the conveyor belt to be stored in that bin area which has the least amount of material of any of said bins. In an emergency situation, such as all bins being filled to a predetermined level, the control system will revert to a second predetermined program until manual control is established.

In industry there are many mixing and blending operations carried on which require the use of elongated bins or a series of consecutive bins with a tripper and feeder conveyor running above them. This is particularly true of the mining industry where accumulator or surge bins are required between crushing and grinding plants.

It is common practice in this method of material handling to manually positioned the tripper over a preferred, or low bin, and leave it there until the bin is filled to capacity. Meanwhile, other bins have had all the material drawn out, often resulting in major operational inefficiencies. Where bins are filled by continuously traversing the tripper, an unsatisfactory situation usually exists because one or more of the bins may have material withdrawn at a slower rate than those adjoining and thus will become overfull, resulting in serious spillage or, in same cases, complete failure of the tripper-conveyor system. Such systems therefore are grossly inefficient.

One object of the present invention is to provide a conveying and storage system including a conveyor belt and a traveling tripper for use with the belt, the tripper being operated to deposit ore or similar material in an elongated pile, optionally in a plurality of bins, the system including a control apparatus for operating the tripper and conveyor wherein the initial installation and maintenance are simpler and comparatively less expensive than is the case with past conventional systems.

Another object of the invention is to provide a conveying and storage system as described, wherein the traveling tripper can be operated automatically by means of its control system to select and fill, for a stipulated period of time, the low bin in a series of bins.

A further object of the invention is to provide a system of the character described wherein the tripper can be operated by manual control whenever desired.

Still another object of the invention is to provide, in a system of the character described, a tripper control apparatus which provides automatic "spot" discharge in which the tripper seeks the closest low bin and remains over that bin until the control apparatus causes it to move or until it is filled, and in which latter event an emergency self control system will then automatically move the tripper over an adjacent bin. Should the adjacent bin be full, the tripper will continue moving in the same direction under self control until a low bin is found or until a reversing limit switch is activated which will start it traveling in the opposite direction. If a low bin is not found, the tripper will continue traversing between reversing limit switches, or until placed under manual control.

A related object of the invention is the provision of means for activating an alarm when the bin or bins become overfull and the tripper is forced into self control.

Yet another object of the invention is to provide control means whereby an operator at the control console can, by depressing and holding a control button, reposition the tripper at any desired location without removing it from program control. This will prove highly desirable and advantageous when the bin level readout display shows several very low bins and the operator, for one reason or another, may wish to put some material in each of them at that time in preference to having the tripper remain full time over one low bin. By the same control means, when the tripper is not on program control, an operator at the console can spot the tripper at any point he desires for any period of time.

Still another object of the invention is to provide means whereby the tripper may be manually set to traverse between two mechanically set points, said points being readily changeable to lengthen or shorten the traversing distance on the elected area for traversing.

A more general object of the invention is the provision of a system of the character described in which the control system for the tripper can be programmed to operate in a particular desired sequence and in which the controls can be adjusted to depart from the desired program in the event that conditions require such departure, as, for example, failure of the level determination section of the control or mechanical failure of the timing control or drum at the control center.

SUMMARY OF THE INVENTION

Briefly, the invention can be summarized as follows: The conveyor belt and tripper are mounted above a series of side-by-side bin locations or other suitable receiver areas. The tripper discharges material, such as crushed ore, from the conveyor belt into the bin locations over which it is positioned. A sensing device, such as a magnetic proximity switch, is mounted on the tripper unit and fixed indicators are attached to each bin or station location to form indexing points. A reversing power contactor is mounted on the tripper unit for use when the tripper is operating under manual or self control. Another reversing contactor unit is mounted in a convenient fixed position for use in conjunction with the reversing contactor unit on the tripper, when the tripper is operating under the control of the remote console circuitry. These contactor units serve to reverse the direction of travel of the tripper, as determined by the location of the low bin. Trolley wires are provided to transmit intelligence from the central control console to the tripper unit as well as in the reverse direction. In some instances, it may prove desirable to use two-way radio transmission between the tripper and console in place of the trolley wires.

In addition to the tripper-mounted autonomous (self) control reversing power contactor mentioned above, the tripper also carries an emergency limit switch which becomes operative to cut off all power to the tripper in the event of failure in the reversing power contactor or its control circuit. The tripper-mounted autonomous control and the emergency limit switch are each operated by respective actuator bars located at each end, or at other desired points, of the proposed maximum tripper run, the emergency limit switch actuators being located a short distance beyond the position of the autonomous reversing contact actuators. Loss of tripper control in an emergency situation or at any time, results in an alarm at the control console. If desired, the operation of the emergency limit switch may be used to stop the conveyor belt or to stop any more material from being fed onto it. A bidirectional motion switch is mounted on the tripper drive motor transmission shaft and connected in the tripper control circuit to prevent plugging of motor when the tripper is operating under self, or autonomous, control.

The control system described in the present embodiment of the invention is primarily arranged to provide "spot" discharge over a predetermined low bin where the level of ore, or other material, is lower than the level of material in other like areas. Spot discharge takes place when the tripper is stationary over a selected bin, with the conveyor operating continuously to deposit material into that bin. This may be contrasted with a "blanket" type of operation, wherein the tripper moves continuously back and forth over the bins, or a selected group of bins, in the manner set forth in my copending application Ser. No. 596,976 described above.

The control system for the tripper includes a sensing installation at each bin for determining the level of material within the bin. Each sensing installation may include, for example, suspended probes of varying length, to determine the level of material within the corresponding bin and to transmit this information to the control console. The sensing function may be performed by other suitable level-measuring devices such as strain gauges, or load cells, which may be installed in the bins in such a way that the level of material in the bin is determined by weight. Similarly, commercially available sonar-type sensors may be installed above the bins to determine level by measuring the time or strength of reflected wave energy, or any other desirable method may be used that will result in discrete units of electrical energy being supplied to the control console to accurately reflect the varying level condition of a bin. Means are provided at the control console for interrogating each sensing element to determine location of the low bin.

In accordance with a preferred embodiment of the invention, the control console includes an electrically activated bidirectional stepping switch which operates in one of its directions for each direction of tripper travel. This stepping switch is disposed to cooperate with a synchronizing limit switch located at one end of the tripper travel and with the indexing points at each bin location to program the operation of the tripper. The stepping switch employs two impulse-type driving motors, one of which is activated by the proximity switch located on the tripper each time it passes an indexing point. Determination of which stepping motor receives the pulse from the proximity switch is made by the state of energization of directional relays in the console. Bin index points are represented by contact points of the stepping switch and are electrically connected with the level sensing controls in such a way, as will be shown later, that upon command from the program timer, the tripper will travel in the desired direction to the designated low bin, stop, and remain there until the next command from the console programmer.

A safety override is provided in the control system for the situation where the tripper is under automatic control and the bin into which it is discharging becomes overfull. In such a case, the system will sense the condition of the bin and will automatically cause the tripper to be moved to a bin that is less than full. At the same time, an alarm is activated at the control console and the tripper is released from programmed control by the console system. Under these conditions, the tripper can be described as under autonomous control. The tripper remains under this self control until an operator places the system under manual control or back on console control.

An additional protective device on the tripper is a sensing system that causes an alarm at the control console in the event there is a choke-up in the discharge chutes from the tripper and the ore or material from the belt starts discharging at random.

BRIEF DESCRIPTION OF THE DRAWINGS

The foregoing and other objects, as will as the various novel features which are characteristic of the present invention, will be understood more clearly and fully from the following detailed description and from recital of the appended claims, taken in conjunction with the accompanying drawings, in which:

FIG. 3 is a fragmentary side elevation, partly broken away, illustrating the construction of the traveling tripper;

FIG. 4 is an end plan view taken along the line 4—4 of the traveling tripper of FIG. 3, illustrating the arrangement of the discharge chutes;

FIGS. 5A to 5C is a schematic wiring diagram showing one way in which a control console can be wired in accordance with a preferred embodiment of this invention;

FIG. 6 is a schematic diagram of suitable bin level and cycle rate circuits that may be used in one embodiment of the invention;

FIG. 7 is a schematic wiring diagram showing one way in which the traveling tripper can be wired, in accordance with the same embodiment of this invention, for connections to the control console and other control wiring;

FIG. 8 is a schematic wiring diagram showing one way in which the remotely located reversing switches and contactors can be wired in accordance with the same embodiment of this invention;

FIG. 9 is a schematic wiring diagram of the power supply switching for the same embodiment of the invention;

FIG. 10 illustrates the relationship of FIGS. 5A—6;

FIG. 11 is an elevation view of the control console;

FIG. 12 is a diagrammatic illustration of the manner in which the traveling tripper is wired to cooperate with the level sensing devices in the bins and with other parts of the control system.

DESCRIPTION OF A PREFERRED EMBODIMENT

Figure 1:
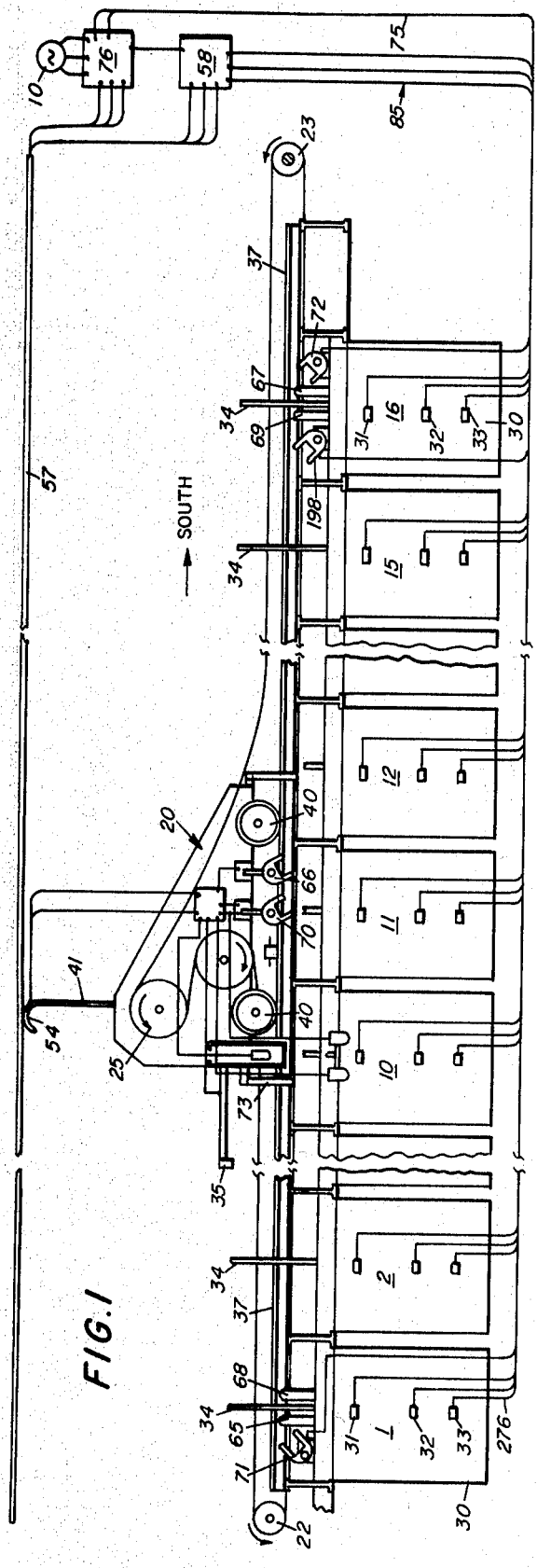
FIG. 1 is a fragmentary, diagrammatic side elevation, partly broken away, of a system constructed in accordance with one preferred embodiment of the present invention and showing a series of storage bins, a traveling tripper disposed along the upper reach of the conveyor belt, and parts of the control system for the tripper.

Turning now to a more detailed description of the tripper and conveyor system of the present invention, reference is made to FIGS. 1, 2, 3, 4, and 12, wherein there is illustrated generally at 20 a tripper arranged in accordance with the present invention. These four figures are substantially identical to corresponding FIGS. 1—4 and 9 of my prior application Ser. No. 596,976, and reference is hereby made to such application for a full and complete description of the tripper structure and the general manner in which it operates.

TRIPPER STRUCTURE

In brief, the tripper is designed to move along the upper run of a conveyor belt 21 which stretches between a head conveyor pulley 22 and a tail conveyor pulley 23. The upper run of the endless conveyor belt, which may be driven by a conveyor drive motor 24, (FIG. 2) passes through tripper 20, from right to left as viewed in FIG. 1, the conveyor passing over a first snub pulley 25 and around a second, or lower, snub pulley 26, the material carried by the conveyor belt being discharged therefrom as the belt passes over snub pulley 25. The material so discharged falls into tripper ore chute 27 and is directed thereby into ore bins 30 and 30' located on either side of the path of travel of the tripper. As may be seen in FIGS. 1 and 2, and as further illustrated in FIG. 12, ore bins 30 and 30' are arranged in a series along the path of travel of the conveyor belt and the associated tripper 20. Bins 30 and 30' may be separate ore storage locations on opposite sides of the tripper, or may be considered as being a single bin having two intake areas. For purposes of this disclosure, bins 30 and 30' are considered to be a single storage location and thus will be referred to as a single bin. For purposes of illustration, the present embodiment is shown as having 15 bins or storage areas and the control circuitry described herein is predicated on this number of bins. However, it will be apparent to those skilled in the art that any desired number of storage areas may be used with the general principles described herein.

In this embodiment, each bin is provided with a set of probes diagrammatically indicated at 31, 32, 33 and which may be carried by rods of varying length to reach different levels in the bins, since this is a prevalent manner of determining the level of material in a bin. It will be readily recognized by those familiar with the art that such probes may be conducting metal rods or they may be capacitance type probes and that they will be suitably mounted in their corresponding bins. Furthermore, it will be recognized that circumstances will determine where it will be desirable to replace the probes with a load cell, sonar device, strain gauge, or the like to indicate the level of material.

The illustrated probes are hereinafter referred to in connection with their corresponding bins, with the probes of bin 1 being referred to as 31–1, 32–1, and 33–1 respectively, the probes for bin No. 2 being referred to as 31–2, 32–2, and 33–2, and so on. A similar means of indicating various elements which are duplicated in or for the several bins will be used hereinafter, the first number referring to the element and the second number referring to the bin in which that element is located.

Each bin is provided with an indexing bar 34 which cooperates with an indexing probe 35 carried by the tripper to provide a proximity switch, or like device, which will produce pulses during travel of the tripper to provide an indication of the location of the tripper with respect to the series of bins. The proximity switch employed may be of the photosensitive type, capacitance type, magnetic type or any other type producing an electrical pulse when a properly defined index point is encountered. In this instance a magnetic type switch is illustrated, the switch consisting of an electromagnet and relay carried by probe 35 and a piece of ferromagnetic material mounted on each of the indexing bars 34, whereby an electrical pulse is produced in the relay circuit as each indexing bar is passed.

Mounted on a trellis formed by girders 36 extending over the bin areas are tracks 37 extending the length of the bin area. These tracks are arranged to carry the tripper as it moves along the path of the conveyor over the various bin locations. The girders 36 also support the rollers required for guiding the conveyor belt, but these, being conventional, have not been shown. Tripper 20 is provided with wheels 40 adapted to engage rails 37 to carry the tripper in its path of movement.

Mounted on the tripper and extending to one side thereof is a trolley support 41, carrying at its outer end three power collectors 42, 43, and 44. These power collectors cooperate with the three power conductors 45, 26, and 47, respectively, to transmit power from an external source of three-phase or direct current power to the tripper to energize its drive motor 48, the power being supplied by way of suitable reversing contacts to be described below. Although the present device is illustrated as being powered by three-phase current, it will be apparent that a direct current power source may be used with appropriate modification of the system. Power conductors 45, 46, and 47 are positioned adjacent the path of travel of tripper 20 whereby contacts 42, 43, and 44 will pick up current for transmission through conduit 49 to tripper junction box 50. In a similar manner, the trolley 41 carries control collectors 52, 53, and 54 which cooperate with control conductors 55, 56, and 57, respectively, to transfer various control signals between a central control console 58 (FIG. 2) and the control circuitry on the tripper. These signals are transmitted by way of conduit 59 to the junction box 50 on the tripper. Conductor 55 carries the power control signals from the console, while conductor 57 carries the console alarm circuit signals, as will be more fully set forth hereinbelow.

Located at each end of the actuators can of travel of tripper 20 are various switches and switch actuators which cooperate with corresponding elements on the tripper itself to provide limit control of the operation of the tripper. If it is assumed that movement of the tripper to the right, as viewed in FIG. 1, is travel in a southerly direction and movement to the left is travel in a northerly direction, then the various switches and ACTUATORS be identified as north or south limit switches. Accordingly, a north-south travel limit switch 66 carried by tripper 20 is operated by two actuators 65 and 67 located at the left and right hand ends of the bins, respectively, the switch 66 serving to disconnect power from the tripper drive motor in the event that the tripper moves beyond its predetermined limits along track 37 while in the manual mode of control. At either end of the path of travel of the tripper, so located as to become operative before limit switch 66 is operated, are north and south reversing limit actuators 68 and 69, respectively, arranged to actuate a reversing limit switch 70 on the tripper. Actuators 68 and 69 are so placed with respect to the travel of the tripper that they become operative only when the tripper is operating under autonomous, or self, control, actuators 68 and 69 serving to reverse switch 70 at each end of the tripper run automatically and before the travel limit switch 66 is operated. It is switch 70 which causes the tripper to traverse between opposite ends of its run when the control console has been disabled and the tripper is under self control. Moreover, if desired, actuators 68 and 69, or other actuators serving the same purpose, may be relocated at any desired position along the tripper run for the purpose of manually setting the tripper to traverse in any given limited area.

At each end of the tripper run, near the location of the emergency travel limit and the north and south autonomous reversing limit actuators, are north and south over travel limit switches 71 and 72, respectively, which are actuated by north and south remote limit switch actuators 73 and 74, mounted on the north and south ends of tripper 20. Switches 71 and 72 are connected through conduit 75 to the remote master reversing contactor 76 for use in conjunction with the automatic control circuitry, as will be described below.

To provide alarm signals in the event of an emergency condition, tripper 20 carries a choke-up sensing probe 77 located in each arm of chute 27 to provide a signal upon occurrence of a stoppage in the chute. This alarm signal may be connected through lines 78 to the tripper junction box 50 and thence through the control conductors to the central console, where an audio alarm may be sounded and movement of the conveyor belt stopped until the blockage is removed. A pair of bin sensing probes 80 and 81 are carried by the tripper to sense overfull conditions in any bin over which the tripper is discharging. If an overfull condition is sensed, a signal is applied through lines 82 and 83 to the tripper junction box 50. These signals are transmitted to the central control console where, again, an alarm is sounded and the programmed control sequence which required material to be discharged into the overfull bin is disabled and another program takes over, as will be explained below. It should be noted that bin level indicator probes 31, 32, and 33 are connected through a conduit 85 to the central control console 58.

CONTROL CIRCUITS

Considering, now, the control circuitry in the system in both its manual and automatic modes of operation, reference is made to FIGS. 5A, 5B, 5C, and 6, which comprise the schematic diagram of the central control console, to FIG. 7, which is a schematic diagram of the circuitry carried by tripper 20, to FIG. 8, which illustrates the circuitry of the remote reversing contactor 76, including the south and north overtravel limit switches 71 and 72, and to FIG. 9, which illustrates the power supply for the system. The control circuitry in these figures is comprised of numerous relay coils and associated contacts, all of which are illustrated in their rest, or deenergized condition. The various relay coils, when energized, shift their corresponding contacts to the position opposite that shown in the drawings. Those contacts which correspond to the various relay coils carry the same number as their operating coils plus an alphabetical designation.

Figure 5B:
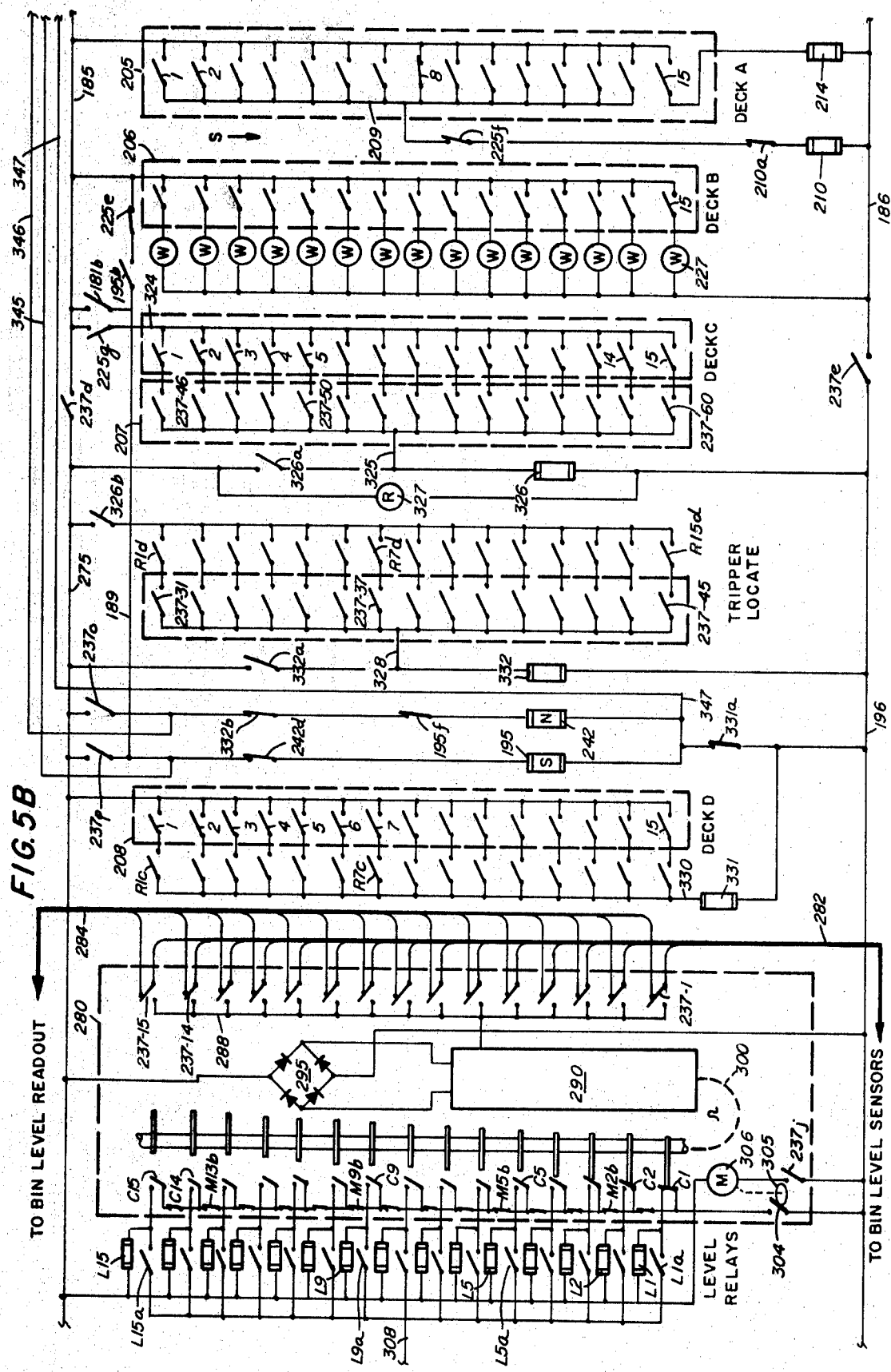

FIG. 5A illustrates the tripper start and position synchronization mechanism which correlates the function of the tripper control with physical bin locations. FIG. 5B illustrates the various functions of the bidirectional stepping switch and its four decks A, B, C, and D, as well as the interrogation system for bin probes. FIG. 5C further illustrates the function and relationship of relay arrays in the determination of the low bin and its location. FIG. 6 illustrates in detail the bridge balancing circuits used to establish bin levels and to determine the cycle rate of relocating the tripper. While the bridge circuits illustrated are commonly used in resistance measuring and null balancing circuits, it must also be recognized that potentiometer circuits may be substituted in their place where varying output potentials are involved, with equally satisfactory results.

POWER SUPPLY

As illustrated in FIG. 9, the system preferably is energized by a source 100 of three-phase electrical current supplying phases A, B, and C through master switch 101 and through phase reversing contactors 102 to the power conductors 45, 46, and 47. Reversing contactors 102 serve to reverse phases A and C which supply the drive motor in tripper 20, and thus to reverse drive motor 48, when so programmed by the control console. As may be seen in FIGS. 2 and 7 the three-phase current appearing on lines 45, 46, and 47 is collected by collector contacts 42, 43, and 44, respectively, which are mounted on the tripper, collectors 42, and 44 applying the reversible phases A and C to motor 48 through continued power conductors 45 and 47 and three-phase motor switch contacts, or contactors, 103, and 104, and collector 43 applying phase B to the tripper through continued conductor 46. Motor contacts 103 and 104 may also be used to reverse motor 48, these switches being used when the tripper is under manual control or under autonomous control, while phase reversing switch 102 is used when the tripper is under automatic control. Phases A and B from alternating current source 100 are also applied to the control console through lines 46 and 47.

MANUAL TRIPPER CONTROL

When the tripper is in the manual mode of operation, one of the two sets of contacts in phase reversing switch 101 is normally closed (manually), as explained below, to apply phases C, B, and A, for example, to the power conductors 45, 46, and 47, respectively. Mode selector switch 107 (FIG. 7) is switched to "manual" to apply power through appropriate start and stop switches to either the north run or the south run relay coils 108 or 109, respectively. It should be noted that mode selector switch 107 includes contacts $a$, $b$, and $c$ mechanically connected to effect the required circuit changes for manual and automatic operation. Under manual control, the tripper moves in either a north or south direction under direct pushbutton control of an operator at the tripper, with the only automatic feature being an automatic shutdown if the tripper travels too far along its track. If the tripper is to run in a northerly direction, the north run start button 110 is depressed, permitting current to flow from line 46, through selector switch contact 107a, through normally closed north stop button 111, normally open (but now closed) north start button 110, normally closed south interlock switch 109b, north run relay coil 108, normally closed overload 112a, through normally closed north emergency limit switch contact 66' and through normally closed safety lockout switch 217 to line 47. This energization of relay coil 108 closes contact 108a to provide a self-holding circuit for coil 108 to keep the tripper on its northerly course until north stop button 111 is depressed. Coil 108 also opens contact 108b in circuit with south run relay coil 109 to prevent energization of coil 109 before deenergization of coil 108. Coil 108 further operates to close contacts 108c of motor switch 103, thus connecting motor 48 to the source of alternating current power across lines 45 and 47 to drive the tripper in a northerly direction.

To reverse the direction of the tripper, stop button 111 must be depressed to deenergize north run relay coil 108, thus releasing contacts 108a, 108b, and 108c, and stopping drive motor 48. South run start switch 113 may then be depressed to energize coil 109. Energization of 109, by way of contactor 107a, south run stop button 114, north interlock 108b overload contact 112b, emergency limit switch contact 66" and safety lockout switch 217, closes self-holding contact 109a opens interlock 109b in the north run circuits and closes contacts 109c of motor switch 104, thus reversing the phase of the current applied to motor 48 and driving the tripper in the opposite direction. The tripper may be stopped by depression of south run stop switch 114. Overload contact switches 112a and 112b serve to stop the operation of the tripper in the event of an overload condition, while emergency limit switch contacts 66' and 66" open the respective north and south run relay coil circuits in the event that the tripper contact switch indicated at 66 in FIG. 1 engages either the north or the south travel limit actuators 65 or 67, respectively. When either of these emergency switch contacts 66' or 66" is opened, the tripper comes to a stop and will remain stopped until it is manually reversed.

TRIPPER CHOKE AND BIN OVERFULL SENSING

The tripper is provided with an ore chute choke-up sensing device and a bin overfull sensing device, both of which may operate to sound an alarm at the central control console in the event of a stoppage in the ore chute or the occurrence of an overfull condition in one of the respective bins. The choke-up alarm utilizes a probe 77 located in the ore chute. This probe may be any one of the many known level sensing devices, the one shown herein being typical. Probe 77 is in circuit with a relay coil 120 which is inductively coupled across supply lines 90 and 91 by means of a transformer primary winding 121. Power is applied to lines 90 and 91 through the secondary winding of transformer 221 connected across two power supply lines, such as 46 and 47, to energize relay coil 120, but no current will flow through it until an ore stoppage occurs in the ore chute, for the sensing circuit of probe 77 is incomplete until that time. When a stoppage occurs in the area of probe 77, an electrical path is completed from a ground point through coil 120, through probe 77, and through the ore to the frame of the tripper. This permits current to flow through relay coil 120, causing relay contact 120a to close. Closure of this contact completes a circuit from line 46 (phase B) through line 122 and contact 120a to the console alarm circuit collector 54, thence to the corresponding control trolley conductor 57, which is carried to the control console (FIG. 5A) by conduit 123, through the primary of transformer 125 to power supply line 105 (phase A), thereby energizing an alarm circuit 126. The alarm circuit may be comprised of a horn 127 and a red warning light 128 connected in parallel across the secondary of transformer 125. An alarm silence button 129 may be provided in series with horn 127 to permit the sound to be turned off while the choke-up condition is being corrected. As will be noted in FIG. 11, the horn, warning light, and silence button may be located on the front panel of the control console.

To sense overfull conditions in the bin over which the tripper is located, a probe 81, which again may be any one of the many known level sensing devices, is connected through a relay coil 130 (FIG. 7) to ground, and the probe circuit is energized by means of a primary winding 131 connected across power supply lines 90 and 91. With the level sensor herein illustrated, as with the choke-up probe 77, a circuit is completed through relay coil 130 when probe 81 comes in contact with the ore in one of the bins, thus permitting current to flow through relay coil 130 to close contact 130a. Closure of contact 130a energizes slow pickup relay coil 132 which is in series with contact 130a across power supply lines 90 and 91. After a preset delay time, coil 132 energizes program timer relay 140 by closing series contact 132a, relay 140 in turn closing its corresponding contact 140a to energize bin overfull relay 142 and parallel warning lamp 143. Energization of relay 142 closes contact 142a to complete a circuit between power supply conductor 46 and conductor 105 (FIG. 5A) to energize alarm circuit 126, as described above. At the same time, coil 132 closes contact 132b to energize unlatching relay 144, which is connected across lines 46 and 47, thus opening and leaving open contact 144a and removing phase A power from line 55 in conduit 123 when the tripper mode switch 107 is in its automatic position. As will be seen below, this will remove power from the control console. It should be noted that the tripper choke and bin overfull sensing circuits are operable in the manner here described to activate the alarm system when the tripper is on automatic control. Since the overfull bin sensing probe is for use with automatic control, it operates the alarm through intermediate relays; however, this sensing probe can be modified, if desired, so that relay coil 130 operates relay contact 142a directly rather than through the repeater relays 132, 140 and 142.

MANUAL-TRAVERSING CONTROL

In some circumstances, it will be desired to cause the tripper to traverse between two set points over the bins, an operation which may be similar to the above-described manual operation. But, whereas the manual operation provides response to manipulation of the start and stop buttons 110, 111 and 113, 114, by an operator at the tripper, with emergency travel limit switch 66 stopping the tripper at the ends of the track if the operator does not do so, the manual-traverse operation permits continuous back-and-forth tripper motion without console control and without operator control, except to change travel limits.

To place the tripper in the manual traversing mode, the remote reversing contactor 76, illustrated in detail in FIG. 8, is utilized. As seen here, a mode switch 150 is provided which allows the remote reversing contactor to be switched from an automatic mode to a manual mode. In the automatic mode, switch 150 disconnects the unit from the power source line 46, and the contactor operates under the control of the central control console. When in the manual mode, switch 150 is closed to provide phase B power through the normally closed interlock contact 152a of a south run coil 152 in contactor 76. Contact 152a permits power to be applied through a north run relay coil 154, through an overload contact 156a, and through the normally closed contact 71' of the north overtravel limit switch 71 (illustrated in FIG. 1), to line 47, which is the phase A power supply line. Shifting of switch 150 to the manual position and the resultant energization of north run coil 154 serves to close contact 154b in the power supply of FIG. 9, thereby providing power to the tripper and to the tripper motor reversing contactors 103 and 104.

The mode selector switch 107 for the tripper may then be shifted to the automatic ("auto") position to permit it to operate in the semiautomatic manual traversing mode. A manual traversing mode switch 160 is provided in the tripper circuit and includes two contacts 160a and 160b which are both normally open and in the off position, but when switch 160 is shifted to the on position, contact 160a closes momentarily. The momentary closure of this contact energizes unlatching coil 144 which latches open its contact 144a to disconnect power line 46 from power line 55 in conduit 123. This insures that the control console is not operating to regulate the movement of the tripper during this manual traversing mode. It is noted that contact 144 may be latched closed by its corresponding latching relay 144', as will be described below. Contact 160b is a maintained contact and serves to apply power from power supply line 46 through relay coil 142, line 161 and normally closed safety lockout pushbutton switch 217 to power supply line 47. Energization of coil 142 closes contacts 142b and 142c leading to the contacts 70' and 70", respectively, of the north-south reversing switch 70. Contacts 70' and 70" are mechanically interconnected so that only one contact at a time can be closed, and opening of one results in closure of the other.

Since mode switch 107 is in the automatic position, a circuit may now be established from power supply line 46 through mode switch contact 107b and through one or the other of the parallel circuits leading to contacts 70' and 70". These parallel lines include normally closed contacts 163a and 163b, respectively, of motion switch 163 connected to motor 48 and normally open contacts 142b and 142c, respectively, discussed above. Depending on which of the contacts 70' and 70" is closed, a circuit will be established through either the N run coil 108 or the S run coil 109. In FIG. 7, for example, contact 70' is shown closed, and a circuit is thus established to the N run coil 108 through its interlock contact 109b, the overload contact 112a and the normally closed contact 66' of the north-south travel limit switch 66, through normally closed pushbutton switch 217 and thence to power supply line 47. Energization of N run coil 108 picks up contacts 108c in the motor contactor 103 and the tripper is activated to run in a north direction. The tripper will continue traveling until it encounters actuator 68, which may be located at the selected northernmost bin which the tripper is to traverse. Actuator 68 will then open contact 70' and close contact 70", deenergizing the N run coil and energizing the S run coil 109 through normally closed contact 108b, 112b and 66'. Energization of S run coil 109 closes contacts 109c in the motor contactor 104, contacts 108c having been opened by deenergization of the N run coil, whereby the tripper motor 48 will be reversed to start the tripper in the opposite direction. Again, the tripper will run in a south direction until it encounters actuator 69, which is placed at the desired limit of traversing, thereby again reversing switch 70 and causing the tripper to move in a north direction.

Actuators 68 and 69, or others serving the same purpose, may be temporarily or permanently established at any desired location along the tripper runway to control tripper traversing in a preferred area, and when the unit is placed in the manual traversing mode as described above, the tripper will move back and forth between the limits established by these actuators, without further control by the operator and independent of the control console.

TRIPPER AUTOMATIC CONTROL

To operate the tripper under the automatic control of the central control console, the tripper is shifted from manual to automatic control, or if in the manual traversing mode described above, the remote reversing contactor is shifted from manual to automatic and the tripper mode switch is left in the automatic control position.

When the mode selector switch 107 is manually shifted to the "automatic" position indicated in FIG. 7, contacts 107a, 107b, and 107c are transferred to their "auto" positions. The power-on button 95 may then be depressed, opening contacts 96 and closing contacts 97 to complete a circuit from power supply line 46 to power supply line 47 through power control relay coil 144' and safety lockout switch 217. This energizes coil 144', which is the latching coil of a two-part mechanically latching and unlatching relay, which includes unlatching relay 144, to close contact 144a in circuit with mode selector switch contact 107c. Coil 144' also latches closed contact 144b, in circuit with contacts 96 of power on button 95. Even after the release of power-on button 95 and the resulting deenergization of coil 144', contacts 144a and 144b will remain closed, opening only upon energization of the unlatching coil 144, in circuit with normally open contact 132b.

The closure of contacts 144a and 107c completes a circuit from line 46 (phase B) through tripper console power control relay collector 52 and its corresponding control trolley conductor 55, through conduit 123 to the master relay of the control console (FIG. 5A) and thence to power line 110 (phase A). This energizes power relay coil 170 and operates its corresponding relay contacts 170a through 170d (FIG. 5A) in the control console. The opening of normally-closed contact 170a temporarily removes power from remote reversing contactor 76 by opening line 172 which leads by way of conduit 174 to the N run relay coil (normally closed for manual or self operation of tripper) of the contactor 76. This deenergizes phases A and C of the tripper power supply by opening both sets of contacts 152b and 154b in switch 102 (FIG. 9) and prevents movement of the tripper before the control circuitry has been set up. Power is applied to the console control circuitry by closure of contact 170c and the system is ready to operate automatically. It should be noted that under automatic control both sets of switch contacts in the phase reversal switch 102 remain open until the control circuitry commands the direction in which the tripper is to move, and thus establishes the direction in which the motor 48 is to rotate. At that time, one or the other of the sets of contacts in phase reversal switch 102 will be closed by the appropriate relay coil to apply appropriately phased power to the tripper drive motor.

AUTOMATIC CONTROL - STARTING

Referring now to FIG. 5A, it will be seen that the power supply from phases A and B is connected by way of lines 105 and 106 to the primary of a transformer 176, the secondary of which provides power by way of lines 177 and 178 to the control circuits to be described. A start button 180 is connected across lines 177 and 178 by way of contact 170c which was closed upon shifting of the tripper to its automatic mode and the subsequent energization of power relay coil 170. Also connected in series with start button 180 is a start control relay coil 181. After power has been applied to the control circuitry and conveyor belt 21 started, the start button 180 is depressed, closing its associated contacts, and energizing relay 181. This latter relay picks up its corresponding contacts 181a and 181b (FIG. 5A and FIG. 5B, respectively). Closure of contact 181a establishes a circuit from control power line 177 through contact 170c which bypasses the start switch and energizes a power-on relay coil 182 through a normally closed stop pushbutton 183 to control power line 178. Energization of power on relay coil 182 reverses the position of its corresponding contacts 182a—182d.

Closure of contact 182a enables a circuit to be established from power supply line 106 through the now-closed contact 170b and the now-closed contact 182a to two normally open contacts connected in parallel, which will be further described below and which, when closed, set up the circuits required for tripper travel in one direction or another.

Contacts 182b and 182f are located in series with lines 177 and 178, respectively, and their closure permits further energization of the control circuitry by way of the control power supplied through transformer 176. Contact 182b thus supplies power to line 185 and closure of contact 182f supplies power to line 186. Energization of coil 182 opens its corresponding contact 182c which is connected by way of line 187 through the normally closed, but now open, contact 170a to line 106; similarly, normally closed contact 182d is connected by way of line 188 to line 173, previously discussed.

The control power applied to line 185 is fed through now-closed contact 181b (FIG. 5B) to line 189, this control power remaining on line 189 while the start push button 180 is depressed. The control power on line 189 is connected to a south direction relay coil 195 and thence to control power line 196. The south direction relay coil 195, when energized in this manner, causes its corresponding relay contacts 195a—195f to reverse positions. Closure of contact 195a in FIG. 5A completes the circuit from line 106 through contacts 170b and 182a to line 173, which leads by way of conduit 174 to the remote reversing contactor 76 in FIG. 8. As will be seen there, the power applied to line 173 passes through normally closed interlocking contact 154a and south run relay 152. Energization of coil 152 opens corresponding contacts 152a in series with the north run coil 154 to prevent energization of that coil, and closes contacts 152b in the power supply reversing contactors 102 shown in FIG. 9, thereby enabling power to reach the tripper.

Since the mode switch 107 has been placed in the automatic position, and switch 95 on the tripper depressed (FIG. 7) to close contacts 97 to energize latching coil 144', contacts 144a and 144b are closed. Release of switch 95 then completes a circuit from power line 46, through mode switch 107a, contacts 144b, contacts 96 of switch 95, interlock contact 109b and the north run coil 108. This allows N run coil 108 to be energized and close its contacts 108c in contactor 103 to start motor 48. Although contactor 103 causes the tripper to travel in a north direction while the unit is under manual control, now, under console control, contacts 108c will remain closed to permit the motor to be operated, but will not affect the direction of travel of the tripper. The phase rotation of the power delivered to the tripper motor will instead be regulated by the power supply reversing contactor 102 (FIG. 9), and since contacts 152b are now closed, the tripper will move toward the south. It will be evident from this that if, instead of energizing S run relay coil 152 in the remote reversing contactor of FIG. 8, the N run coil 154 were instead energized by the console command, contacts 154b would close in the reversing contactor 102, phase rotation would be reversed, and the tripper would move in a north direction. Thus, when the tripper is under console program control, the console will regulate the direction of the tripper travel by way of coils 152 and 154 in the remote reversing contactor 76, the N run coil 108 on the tripper being continuously energized.

SYNCHRONIZATION OF TRIPPER AND CONTROL CIRCUITS

Figure 2:
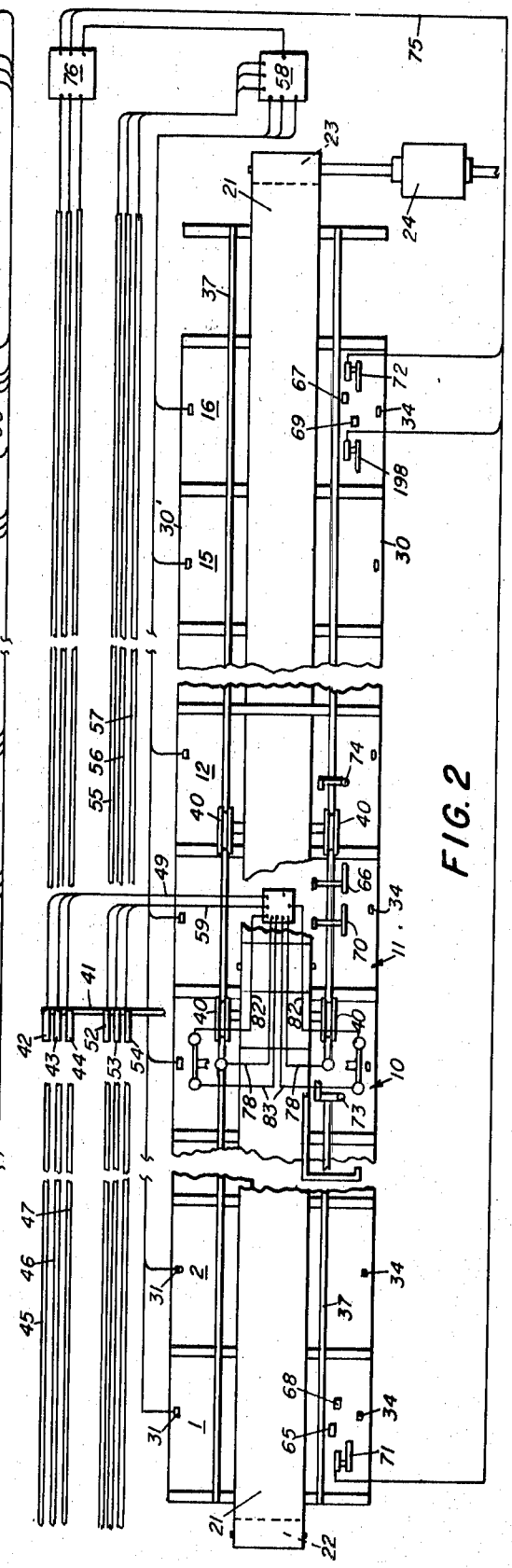
FIG. 2 is a fragmentary top plan view of the device of FIG. 1, partly broken away.

The foregoing steps in energizing the south direction relay coil 195 has resulted in starting the tripper toward the south end of its path of travel and this is the normal starting procedure when the tripper is to be operated under console control. A synchronizing limit switch 198, illustrated in FIGS. 1 and 2, is located at the south end of the tripper path, this switch being connected to the central control console by way of the remote reversing contactor, as will be described.

Energization of relay coil 195 (FIG. 5B) resulted in closure of corresponding contact 195b in line 189, providing a bypass for normally open contact 181b so that control power from line 185 will continue to flow to the relay coil 195 after the start button 180 is released. The south direction relay coil 195 additionally closes its contact 195c (FIG. 5A) which is in series circuit with a south stepper motor 200. Contact 195d is normally closed, but opens upon energization of coil 195 to provide an interlock in series with a north stepper motor 202, thereby assuring that only the south stepper motor will be operable.

When contact 182b closed, control power was applied by way of line 185 to deck A of a bidirectional stepping switch driven in opposite directions by the south and north stepper motors 200 and 202. The stepping switch is indicated generally at 204 in FIG. 5A and at 205, 206, 207, and 208 in FIG. 5B which comprise the decks A, B, C and D of the switch. Each deck of the stepping switch comprises a plurality of switch contacts, one of which will always be closed and the remainder of which will be open at each step of the switch. As indicated at deck A, the switch includes fifteen contacts, one of which, for example contact 8, is closed. This completes a circuit from control power supply line 185 through contact 8 to line 209, thence through a pair of normally closed contacts and through a slow release relay coil 210 to the other power supply line 186. Energization of relay 210 causes its corresponding contacts 210a, which are in series with relay 210, to open after approximately one-half second, thereby to deenergize this relay. A second delayed contact 210b, which operates at the same time as contact 210a, is connected in series with the south stepper motor 200 and cooperates with now-closed contact 195c to apply control power from line 185 through a rectifier bridge 212, and a normally closed interlock contact to line 186. Opposite terminals of the rectifier bridge energize the motor 200 to rotate the stepping switch in a given direction, which corresponds to southward movement of the tripper. Contact 210a, which is open during operation of the step motor, then recloses, the reclosure occurring about one-half second after coil 210 has been deenergized. This reclosure is accomplished by the opening of contact 210b, which deenergizes the motor. Since a sequential contact on deck A is now closed, coil 210 is reactivated, causing it to again shift its contacts to open 210a and close 210b, step the motor one step, return to normal to reactivate, the coil, and so on, thereby producing a sequence of steps in the stepping switch until it closes its last contact, in this case contact 15, on deck A. When this occurs, the circuit to line 209 through the deck A contacts will be broken, and a circuit will be completed instead from line 185 through contact 15 to a synchronizing coil 214. Contact 15 will remain closed and the stepper switch will remain in this position until the north stepper motor is activated. Coil 214 will close its corresponding contact 214a (FIG. 5A) in a circuit (described below) leading to the synchronizing limit switch 198 illustrated in the remote reversing contactor circuit of FIG. 8.

Regardless of when the stepper switch reaches the position which corresponds to the southernmost travel of the tripper, the tripper will continue to move south until its actuator bar 74 (FIG. 1) encounters the synchronizing switch 198. This switch has a snap-over toggle operation which reverses the position of its contacts 198' and 198'', opening 198'' and closing 198' (FIG. 8). When the tripper reverses direction and moves north again, actuator 74 will reset switch 198 to its former position, reclosing contact 198''. It is important that this latter contact be normally closed, for it is in series circuit with the south run relay 152 in the remote reversing contactor 76, and its closure, together with the normally closed contact of the overtravel limit switch 72, permits coil 152 to be energized for subsequent operation of the tripper. Thus, opening of contact 198'' deenergizes S run coil 152 and opens its contacts 152b in the power supply contactor to remove power from the tripper and cause it to stop. At this point, both the tripper and the stepping switch are at the same relative location, and synchronization of the two can now be effected.

Closure of contact 198' completes a circuit from power control line 185 (FIG. 5A) through line 218 which leads to conduit 220, line 218 then continuing through now-closed contact 198' to line 219 leading back through conduit 220 to the control circuit of FIG. 5A. Power from line 185 passes through line 219, through a normally closed contact to be described, through now-closed contact 214a and line 222 to a synchronizing relay 225 and thence to control power line 178. Energization of coil 225 in this manner causes its sealing contacts 225a to close, whereby coil 225 is connected directly across lines 185 and 178. The tripper will remain at the southernmost index point, as will the stepping motor, until the control system locates the low bin and starts the tripper moving toward it.

It will be apparent that decks B, C and D of the stepper switch, as well as deck A, will be closed at contact 15, since all of the decks are ganged together for concurrent operation. This position of the stepper switch has no immediate effect on decks C and D, but the deck B contacts, all of which are connected in series with corresponding indicator lamps, are operable at this time. When the stepper switch reaches its southernmost step, lamp 227, which is in series with contact 15, is connected across control power lines 185 and 186. This provides an indication on the tripper position indication array 230 located on the control panel illustrated in FIG. 11. If the right-hand side of the array 230 is to indicate the southernmost extent of the tripper, then the right-hand lamp will correspond to lamp 227 in deck B.

Since the contacts in deck B are each connected through corresponding indicator lamps, it will be apparent that movement of the tripper under direction of the program control, which will cause deck B to step in synchronization with the movement of the tripper, as will be described, will cause the lamps to be illuminated sequentially to indicate to an operator at the control console the exact position of the tripper at a given time. As discussed hereinbelow, decks C and D of the stepping switch operate in conjunction with the low bin level determination control.

Returning now to the synchronizing relay 225, its energization closes corresponding sealing contact 225a connected in series between the relay and power supply line 185 to maintain its energization. In addition, contact 225b is closed to provide power from line 185 through a variable speed programmer 234, indicated in dotted lines in FIG. 5A and shown in further detail in FIG. 6, the other side of the timer being connected to line 178. The variable speed programmer includes a program timer 235, a drive motor 236, and a program drum 237 connected and driven by motor 236 by way of a suitable shaft 238.

Synchronization relay 225 opens contact 225c in line 219, thus removing this source of energization from the relay circuit, whereby sealing contact 225 will provide the only source of power for relay 225 and assure maintenance of synchronization. Contact 225d is connected in circuit with the stepper motor 204 and operates to set up this step motor circuit so that either the south stepper or north stepper motors 200 and 202, respectively, can be energized through a relay contact 240a of a proximity relay coil 240 (FIG. 5A) to be described. Also connected in circuit with contacts 225d and 240a are the direction relay contacts 195c, responsive to the south direction relay coil 195 (FIG. 5B) discussed above, or its companion contact 242a which is normally open and which is closed by energization of a north direction relay coil 242 (FIG. 5B) connected between line 185 and 196 through various relay contacts to be described. Thus, when both contacts 225d and 240a are closed, one or the other of stepper motors 200 and 202 can be energized, depending upon whether contact 195c or contact 242a is closed. Note that normally closed interlock contact 242b is connected in series with rectifier bridge 212 to prevent energization of the south stepper motor when the north direction relay coil is energized, in the same manner that interlock contact 195d is connected in series with rectifier bridge 244 to prevent energization of the north stepper motor when south direction relay coil 195 is energized. It will be apparent from what has gone before that upon closure of the series contacts 225d, 240a, and 242a, rectifier bridge 244 will be connected across lines 185 and 186, thereby providing DC power to the north stepper motor 202 and causing it to operate.

Relay contact 225e (FIG. 5B) is opened by energization of relay coil 225 to break the circuit to line 189 and thus to the south direction relay coil 195, which was energized to accomplish synchronization. This causes all of the contacts for relay 195 to revert to their original position. Synchronizing relay contact 225f, connected in series between line 209 of deck A and the slow release contact 210, is opened to deenergize the timing relay coil 210. This insures that no additional pulses will reach coil 210 that might step the motor 204 in one direction or the other, and thus maintains the stepper switches at contact 15 while the synchronization is effected.

Synchronizing relay contact 225g (FIG. 5B) closes to connect deck C of the stepping switch to line 185, thereby applying power to deck C for use in low bin location. At this point, then, the control system is synchronized in step with the position of the tripper, the directional relays are deenergized and the stepper motor is deenergized to prevent movement of the tripper or the stepper motor until further instructions are received from the control system.

PROGRAM CONTROL DRUM

As indicated above, the variable speed programmer 234 is connected in circuit with line 233 and contact 225b for energization from power supply line 185. An auxiliary power supply circuit 246 is connected through a normally open contact 237a of the program drum 237, whereby upon energization of the drive motor 236 the program drum will close contact 237a and connect motor 236 through line 246 to the auxiliary power supply line 247, which bypasses contact 182b. The purpose of this bypass is to assure completion of the normal cycle of the program drum even in the event of a malfunction that might cause contacts 182b or 182f to open. The program drum 237 and its associated drive motor 236 are standard commercial items available "off the shelf.". The drum 237 is indicated diagrammatically in FIG. 7 and may consist in one form of a plurality of lugs, contact strips, cam surfaces, or the like, arranged on the surface of the drum to open and close corresponding circuits or contacts in accordance with a predetermined pattern, or program, whereby the associated circuits or contacts will be opened and closed in accordance with the programmed sequence as the drum rotates. In the present embodiment, it is assumed that the drum is provided with suitably spaced cam surfaces to open and close the various corresponding contacts illustrated in the control circuit of FIGS. 5 and 6, but it is apparent that various other arrangements can be used.

To energize the drive motor 236 for the program drum, a timer 235 must first be energized. The timer 235 includes a motor having a variable speed which may be readily controlled by a silicon controlled rectifier circuit of suitable type, indicated diagrammatically at 250 in FIG. 6. The SCR controller may be connected across lines 233 and 178, with the SCR devices being controllably gated by a potentiometer 251 which is itself driven by a suitable motor 252, the position of the slide arm on potentiometer 251 being adjustable by motor 252 to regulate the speed of the timer motor 235. When the timer motor is energized, it rotates cam shaft 253 and cam 254 to close contacts 255, connecting motor 236 across input power supply lines 178 and 233. This rotates drum 237 to operate its corresponding contacts. Immediately upon rotation of drum 237, contact 237a is closed to connect the auxiliary power supply line 246 to the bypass line 247, as has been described, thereby assuring continued power to the drive motor of the drum in the event that relay 182 should drop out. At the same time, contact 237b opens to prevent feedback between lines 247 and 185, to assure that the bypass for contact 182b does not affect other parts of the control circuit. Cam 254 is designed to keep contact 255 closed until the program 237 completes its cycle, at which time contact 237a will reopen and contact 237b will reclose. At this point, cam 254 permits contact 255 to open again.

Program drum 237 includes a contact 237c in circuit with the starting relay 182, the contact being connected between line 260, which leads to the start switch 180, and a bypass line 261. The bypass line 261 includes a sealing contact 182e which closes upon energization of relay 182 to hold that relay in its energized condition. The bypass thus removes contact 181a from the energizing circuit for relay 182, and permits release of start button 180. Series south and north direction relay coil contacts 195e and 242c are connected in parallel with contact 237c to provide an interlock circuit. These series contacts are normally closed, but energization of either one of the direction relay coils will open its corresponding contact and transfer the holding circuit for power-on relay 182 through timer interlocks to be described, since drum contact 237c will also be open at this time. Bypass contacts 237c or 195e and 242c are necessary to maintain power to relay 182 since the timer interlock relay will time out while the tripper is discharging over the selected low bin thereby opening the timer interlock. Power-on relay would then have to be reset by pushbutton 180. When the tripper is in motion, protective timing relays are continuously reset by action of proximity repeater relay contact 240b, as will now be described.

PROXIMITY SENSING

As was discussed hereinabove, the tripper carries on the indexing probe 35 a suitable proximity switch which senses the indexing bars located at each bin location. The proximity switch is indicated in the tripper circuit of FIG. 7 at 265, the switch closing and reopening as it passes by each indexing bar. Closure of proximity switch 265 energizes proximity relay 266 by means of current supplied through transformer 221, thus shifting the corresponding contact 266a for a length of time corresponding to the duration that 266 is energized and completing a circuit from line 46 through the tripper collector 53, conductor 56, conduit 123, and conductor 56 in the control circuit of FIG. 5A. In the control circuit, conductor 56 is connected to a proximity switch repeater coil 240 and thence to line 105, whereby the repeater is pulsed each time an indexing bar is passed by the tripper.

Since, under normal traveling conditions of the tripper, the indexing point will contact the proximity switch for only a second or two, relay 240 will be deenergized most of the time. A timing interlock circuit is provided which is responsive to the periodic energization of the proximity switch and is designed to sound an alarm if the tripper should be delayed more than a prescribed amount of time in its travel from one indexing point to the other. This interlock circuit includes a pair of timing relays 268 and 269 connected across lines 185 and 178 through normally closed contact 240b. Relay coil 268 is a slow release type which is normally energized because contact 240b is normally closed, and thus will hold contact 268a in a closed position during the normal passage of the tripper between indexing points. Closure of timer interlock contact 268a maintains the self-sealing bypass circuit for relay 182, as described above, and maintains the energization of the control circuit. Relay coil 269 is a slow pickup type, and is so timed that during the normal interval of time required for the tripper to pass from one index point to the other, the relay will not pick up its normally closed contact 269a and thus will maintain the bypass circuit for relay coil 182.

If the tripper moves from one to the next succeeding index point within the prescribed time, the proximity repeater relay 240 will open contacts 240b, momentarily deenergizing relay coils 268 and 269. Since 268 is a slow release coil, this will not affect its corresponding contact; similarly, since relay 269 is a slow pickup type and has not yet had an opportunity to open its corresponding contacts, the deenergization occasioned by the opening of contacts 240b recycles this relay so that its timing sequence must begin again. Therefore, under normal operation the periodic pulsing of relay coil 269 will prevent it from shutting down the control circuit. However, if the tripper is delayed in its travel from one indexing point to the other, contact 269 will pick up its corresponding contact 269a and thus deenergize relay coil 182. In this situation, all control power is lost except that in line 177. On the other hand, if the tripper remains too long on an index point, so that contact 240b remains opened for more than the predetermined period of time, relay coil 268 will release contact 268a and similarly deenergize relay 182.

TRIPPER CONTROL ALARM

Release of power on relay 182 recloses the normally closed contact 182f in circuit with an alarm 270 (FIG. 5A). The alarm consists of a horn 271 and a red indicator lamp 272 connected in parallel between power supply line 247 and power supply line 178 through contact 182f. Thus, the alarm system, being responsive to coil 182, and the proximity switch, will be operative only while the tripper is in motion. Under varying circumstances, such as mechanical failure of a drive shaft on the tripper, electrical failure of the tripper drive motor or some other power equipment, derailment of the tripper or slick rails which prevent its proper traversing, or any other circumstance other than the control system that may cause the tripper to stop or slow down will cause the alarm to be sounded at the console. A push button 273 is provided to permit the horn to be shut off while repairs are being effected.

CONTROL CONSOLE RELEASE - ALARM CONDITION

The alarm 270 also serves to warn the operator of the system when the bin under the tripper becomes overfull and causes the tripper to disengage from console control and to go on self-control. When probe 81 (FIG. 7) encounters a conducting material in the bin, the induced voltage in coil 130 closes corresponding contact 130a which, in turn, energizes relay 132. Relay 132 is a time delay, or slow pickup relay which is designed to prevent a temporary grounding of probe 81 from disengaging the tripper from console control. If the probe remains grounded for a predetermined period of time, contact 132a closes to energize coil 140, which is also a slow release relay. Relay 140 maintains energization of the tripper drive motor so that it will continue to move until 140 releases, thus serving to regulate the distance the tripper will move while under self control. If, at the end of the time that the relay takes to release, the tripper is still over an overfull bin, probe 81 will again energize relay coil 140 to move the tripper the predetermined distance. This continues until probe 81 detects a low bin, where the tripper will remain until the bin fills. Relay 140 operates by closing its corresponding contact 140a to energize relay coil 142 and, at the same time, the red warning light 143. Contact 142a closes and provides phase B power on line 57 through conduit 123 to the control console of FIG. 5A. As has been described, line 57 is connected through the primary of transformer 125 to phase A line 105, thereby energizing alarm circuit 126.

As has been explained, the energization of coil 132 by the probe 81 also closes contact 132b to energize the unlatching coil of relay 144, thus opening contact 144a in line 55 to the control console. The unlatching coil similarly opens contact 144b, in series with pushbutton switch 95, to remove the source of power from the N run coil 108.

Referring to FIG. 5A, it will be seen that conductor 55 passes through conduit 123, and upon opening of contacts 144a removes power from power relay coil 170. When coil 170 is thus deenergized, contact 170c will open and the power on relay 182 becomes deenergized to disable all the control circuits. Contact 170d closes and, since it is in circuit with the alarm system 270, that alarm is sounded. Thus, it will be seen that the alarm system 270 responds not only to the proximity switch, but to the bin overfull condition as well, and in both cases a malfunction will sound the alarm and remove the tripper from console control. When this occurs, the tripper reverts to a timed self control operation.

ALARM CONDITION SELF CONTROL

Referring back to FIG. 7, it will be noted that when the relay 142 was energized by the detection of a bin overfull condition, contact 142b in the circuit of N run coil 108 was closed and contact 142c in the S run coil 109 was closed. Power now is available from phase A power supply line 46 through switch 107b (which is in the automatic position), motion switch contacts 163a or 163b and the limit switch 70. Since either contact 70' or 70'' must be closed, either the N run coil or the S run coil must be energized to pick up its respective power contacts and move the tripper in the corresponding direction. The tripper will now move a distance governed by the time it takes timing relay coil 140 to drop out. If probe 81 does not encounter bin material at the end of this time, relay 142 will also be deenergized, opening contacts 142b and 142c. The tripper will then remain stationary until the bin over which it is located becomes full, at which time probe 81 will energize coil 130 and the cycle will begin again, with relay coil 140 becoming energized for a predetermined time, starting the tripper by way of relay 142 and stopping it when coil 140 drops out. The tripper will continue to operate in this mode, being reversed by limit switch 70 when the ends are reached, until the tripper is changed to manual control.

BIN LEVEL DETERMINATION

Returning now to the function of the programming drum 237, it has been noted that its corresponding contacts 237a, 237b and 237c have all been activated by the start of motor 236 following energization of the synchronizing relay 225. Continued rotation of the drum now closes contacts 237d and 237e, located in the control console power lines 185 and 186, respectively. Closure of these contacts applies power to lines 275 and 196, respectively, for energization of the bin determination circuitry. These contacts remain closed until the bin level and low bin location determination has been made and the tripper repositioned over the low bin. After that, these contacts will reopen to drop out all the energized contactors in the bin level determination network and reset the control for the next cycle.

The bin level determination network in the control circuit includes a bin level probe array indicated generally at 280. This probe array includes a series of interrogating contacts which are operated by the rotating program drum 237 to sequentially interrogate the level of ore in each of the bin locations traversed by the tripper. These interrogating contacts are indicated in FIG. 5B at 237-1 through 237-15. The interrogating contacts are normally in the position indicated in the drawing, whereby each contact is permanently connected to the bin level sensors located in a corresponding bin by way of cable 282. Each bin may contain a plurality of sensor probes, the outputs of which may be added in suitable amplifiers and fed as a bin level resistance or voltage value to the probe array 280. Thus, each conductor in cable 282 will carry a signal representative of the ore level in its corresponding bin.

With the switches in the positions indicated in FIG. 5B, each conductor in cable 282 is connected by its corresponding switch 237-1 through 237-15 to a corresponding conductor in cable 284 which leads to the bin level readout indicator on the control panel of FIG. 11. This indicator, shown generally at 286, may include means responsive to the voltage or resistance level for each bin to illuminate appropriate lamps or other suitable indicator means, thereby giving a continuous indication of the bin level for each bin location. Thus, bin 1 may have eight level sensors and thus will be capable of producing a signal having eight different levels. This signal can then be used to illuminate corresponding indicator lamps in column 1 to produce a resultant readout of the level of ore in that bin. Similarly, readout lamps or the like may be provided for each of the 15 columns in indicator 286.

In order to direct the tripper to the bin having the least amount of ore, the program drum 237 cycles each of the switches 237-1 to 237-15 sequentially, whereby each switch will be shifted away from its connection from cable 284 and will be connected to line 288. Only one contact at a time will be reversed for connection to line 288, with the duration of such reversal being dependent upon the length of time required for the bin level determination network, generally indicated at 290, to establish the ore level detected by the particular bin level sensors, or probes. During the time that these switches are shifted away from their connection to cable 284, the level indication at indicator 286 will be interrupted, but will be restored as drum 237 shifts to the next switch in sequence.

The level signals appearing on line 288 are fed to the bin level determination network 290 which is indicated in block diagram form in FIG. 5B and is shown in further detail in FIG. 6. Network 290 is seen to comprise a conventional balancing bridge circuit 289 made up of resistors 291, 292 and 293 comprising three legs of the bridge, with the fourth leg being a variable resistance 294. The variable resistor may be a slide wire potentiometer or a rheostat, the movable arm of which is driven by means of motor 295 mechanically connected through shaft 296. Power to the bridge circuit 289 is supplied, for example, by way of a full wave bridge rectifier 297 which may be connected across power supply lines 196 and 275. A contact 237f is connected in series between the rectifier and the power input to the bridge circuit, and upon closure of this contact near the start of rotation of drum 237 the bridge 289 is activated. The resistance value of resistor 293 is relatively low as compared to the resistance values that will be registered by the potentiometer 294 during the interrogation of the bin level values. As soon as the bridge is energized, any unbalance will result in a current output from the bridge which will be fed to amplifier 298. The amplified current is used to energize motor 295, and since this current is directional, the motor will rotate in such a direction that the movable contact arm of potentiometer 294 will be driven in a direction to balance the bridge and produce a zero, or null, current output.

After the elapse of a sufficient length of time to permit the bridge to reach its null point, the program drum 237 opens the normally closed contact 237g in series with resistor 293. At the same time, contacts 237h and 237i are closed, contact 237h connecting one output terminal of the bridge to ground and contact 237i connecting one output terminal of the bridge to line 288, which is common to the interrogating contacts 237-1 through 237-15, whereby the signals (or measured resistance value) from cable 282 and the bin level sensors can be applied to one terminal of the output of the bridge circuit. In this way, closure of contacts 237h and 237i effectively replaces resistor 293 with the resistance encountered by the bin level sensors corresponding to whichever one of the interrogation contacts 237-1 through 237-15 is connected to line 288, thereby unbalancing the bridge circuit. Since resistor 293 was selected to be lower than any of the bin level sensor circuits, the resistance of this arm of the bridge has now been increased, and current flow through the bridge to amplifier 298 will now be reversed. This will cause motor 295 to rotate in the opposite direction and drive the slide wire contact on potentiometer 294 to a correspondingly higher resistance value. The motor will continue to rotate until a new null point has been reached, at which time the motor stops.

The rotation of motor 295 also drives a cam shaft 300 which carries on it a plurality of similarly shaped cam surfaces, each of which is offset, or angularly displaced, slightly from its adjacent cam, as illustrated generally at 301 in FIG. 6. As indicated in FIG. 5B, there is associated with each of the cam surfaces a normally open switch, the switches being aligned in parallel to cam shaft 300 so that the switches will be sequentially closed by the cam surfaces as the shaft rotates, with only one switch at a time being closed. When the motor 295 rotates to rebalance the bridge circuit of FIG. 6, shaft 300 is rotated to a specific angular position corresponding to the null value of potentiometer 294, and the particular angular position of shaft 300 will result in one of these contacts being closed. These contacts are therefore identified as cam contacts C1 through C15. Since each angular position of shaft 300 corresponds to a definite resistance value of potentiometer 294, and thus of the resistance value measured by the bin level sensors, each cam on the cam shaft 300 may be said to correspond to a determinable value of electrical resistance. The resistance value represented by each angular position of the shaft is thus converted from an analogue (shaft position) value to a digital (switch position) value, with a specific shaft position resulting in a given cam closing its corresponding switch. Therefore, each one of switches C1 through C15 can be said to represent a certain level of material in the bin under interrogation. The particular switch which remains closed when shaft 300 reaches its null position represents the resistance value of the bin level sensor being interrogated and thus represents the level of ore in that bin. For the purpose of illustration, it may be considered that the switches C1 through C15 represent bin levels from one through 15 feet. If the bin level, or ore depth, encountered in the first bin which is interrogated is, for example, 9 feet, upon closure of the interrogating contact 37-1 the bin level determination network 290 will null at a value which will result in shaft 300 being rotated until contact C9 is closed.

Each cam-operated contact C1 through C15 is connected to a corresponding "level relay," the relays being indicated in FIG. 5B at L1 through L15. As indicated, each relay is connected between power line 275 and the normally open contact of its corresponding cam switch. The switch contacts are all connected to the other power supply line 196 in parallel, but each parallel connection is separated from the next by means of an interlock switch contact to be described. These interlock contacts are normally closed, whereby the cam contacts may be connected to line 196. In addition, a periodic switch contact 304 is interposed between the cam switch contacts and line 196, contact 304 being periodically opened and closed by a motor driven cam 305 driven by motor 306. The motor is connected in series with a contact 237j of the program drum 237 across lines 275 and 196.

When cam 300 is properly positioned to indicate an ore level in the bin being interrogated, contact 237j closes to energize motor 306, thereby rotating cam 305 and pulsing contact 304. This latter contact completes a circuit from line 275 through the level relay corresponding to the cam contact selected by the shaft position of cam shaft 300, thereby energizing that relay. Thus, in the example given above, if cam contact C9 is closed, level relay L9 will be energized by closure of switch 304. Once energized, motor 306 will continue operating until all the bin level probes have been interrogated; thereafter, contact 237j will open. The speed of motor 306 is synchronized with the closure of interrogating contacts 237-1 through 237-15 so that cam 305 will not close contact 304 for each readout of bin level until cam shaft 300 has stabilized at its null position. Associated with each of the level relays L1 through L15 are corresponding normally-open contacts L1a through L15a. These contacts close upon energization of their corresponding relays to connect the corresponding cam switch to a common line 308. Thus, for example, when contact C9 closes, relay L9 will be energized and relay contact L9a will close to connect contact C9 to line 308.

In FIG. 5C there is illustrated an array of "level memory" relays M1 through M15 which are responsive to the energization of the level relays. These memory relays are interlocked with the level relays in such a way as to retain information as to the bin location having the lowest ore level. Each of the memory relays is connected in series with a contact b of the corresponding level relay. Closure of one of these "b" contacts connects the corresponding memory relay across lines 275 and 196 to energize it, the connection being made through a series of normally-closed interlock contacts to be described. Thus, for example, energization of level relay coil L9 results in closure of contact L9b in the memory relay and consequent energization of coil M9. This, in turn, closes the normally open holding contact M9a, whereby relay coil M9 is maintained in its energized state.

Each of the level memory relay coils M1 through M14 has a corresponding interlock contact in the level relay array in FIG. 5B. The memory relay interlock contacts operate to prevent energization of a level relay coil during subsequent interrogation cycles unless a lower ore level is indicated, whereby the level relays and memory relays will cooperate to maintain a record of the lowest level found in any of the bin locations. Thus, in the example being considered, energization of relay coil M9 opens its corresponding interlock contact M9b in the level relay array, thus preventing any of the higher numbered cam contacts C10 through C15 from being energized if closed by the position of cam shaft 300 during subsequent interrogation of bin locations. If the level in the next bin interrogated is 10 feet, it would normally be expected that level relay L10 would be energized; however, interlock contact M9b prevents energization of L10. On the other hand, when an ore level less than 9 feet is detected, for example 5 feet, closure of contact C5 permits relay L5 to be energized. This, in turn, operates contact L5 b to energize the memory relay M5 and open contact M5b, thereby deenergizing level relay L9 and shifting the memory relay to coil M5. As will be seen, only a single one of the level relays and memory relays will be energized at one time, thereby assuring that the depth of the ore in the lowest bin will be retained.

The level memory relays M1 through M14 also include normally closed interlock contacts M1c through M14c which are connected in series with each other and which are arranged so that the lowest numbered relay that is energized will remain energized, whereby the array will "remember" the ore level (e.g., in feet) of the lowest bin of the 15 bins interrogated. When coil M9 is energized, then, contact M9c will open and prevent any of the coils M10 through M15 from operating. If no lower numbered relay coil in this array is energized, then M9 will indicate the lowest bin level.

TIME CYCLE FOR PROGRAM TIMER

Referring back to the bin level determination network 290 illustrated in FIG. 6, it will be seen that a second bridge circuit 309 is provided. This second bridge is designed to establish the time cycle for the program timer 235. Thus, if the total available storage volume in all of the bin locations is relatively large, the program drum 237 can be driven to repeat its interrogating and level determination cycles at maximum intervals, thus allowing the tripper to remain for relatively long periods of time over a selected bin location. If, on the other hand, most of the bin locations are well filled, so that only a moderate volume of storage is available, then the program timer speed must be increased so that the interval between program cycles will be materially reduced. This results in the tripper remaining for less and less time over bins that are almost full and further assures that all bins will be full at approximately the same time. Still a further advantage of this decrease in the interval between program cycles is that as the bins approach full level, the tripper will not stay over s selected bin so long that it fills the bin, causes the tripper to sense an overfull condition, and causes the tripper to go off of the program control while other bins are available with adequate storage capacity.

The second bridge 309 is comprises of a pair of resistors 310 and 311 and a pair of motor driven potentiometers 312 and 313 forming the four arms of the bridge. Input power is applied by way of lines 314 and 315 connected across a suitable power source such as full wave rectifier 297. The output of this bridge is applied by way of lines 316 and 317 to an amplifier 318. The output of the amplifier is applied to energize motor 252 which drives the movable slide arm of previously discussed potentiometer 251. The remaining potentiometer 312 in this bridge circuit is driven by means of motor 320 which is connected in circuit with the output of amplifier 298 upon closure of drum contact 237k.

The motor 320 is in circuit with a calibrating battery 321 which may be connected across the motor by means of drum contacts 237l and 237m. The battery drives motor 320 in one direction, to move the slide wire contact on potentiometer 312 in the direction of the low, or zero end of the resistance. When the limit of travel is reached, the motor opens its limit switch 320a, and stops. Contacts 237l and 237m then open, and contact 237k closes to connect motor 320 to the output of amplifier 298 to be driven in the opposite direction. This is normally done before contacts 237h and 237i close to replace resistor 293 in the first bridge circuit of network 290. The output of amplifier 298 will cause motor 320 to rotate with motor 295, thereby adjusting potentiometer 312 in accordance with the position of potentiometer 294.

Contact 237n in power supply line 315 is then closed by the program drum to apply power to the second bridge circuit 309. An output is provided from amplifier 318 in accordance with the unbalance between fixed resistors 310 and 311 and potentiometers 312 and 313, and motor 252 will thus be energized to move the slidable arm of potentiometer 313 to rebalance bridge 309 in accordance with the position of potentiometer 312, which is following the output of bridge 289. At the same time, potentiometer 251 is varied, and since this is the speed control for timer motor 235, the speed of the timer and thus the cycling interval for the program drum 237 is established.

Contact 237k opens after each bin probe has been interrogated so that motor 295 can return the cam shaft 300 and potentiometer 294 to zero without affecting the position of motor 320 or the last setting of potentiometer 312. Since motor 320 can only be reset by the calibrating battery, the motor will continue to move the slide wire of potentiometer 312 in the same direction each time a bin probe is interrogated and a difference signal is produced by amplifier 298. Therefore, potentiometer 312 will act as a totalizer, adding units of resistance to bridge 309 as each bin is interrogated. Upon completion of the interrogation cycle, contact 237n will close, establishing power input to the bridge circuit and producing an unbalanced signal across lines 316 and 317. Motor 252 will immediately operate to balance the circuit, and in so doing will change the value of the SCR control 250 and thus the cycle time of programmer 237. Upon completion of the program timing cycle, the various drum contacts will be reset to their original position, resetting the bridges for the next cycle.

LOCATING TRIPPER AT LOW BIN

In the example discussed above concerning the determination of ore level in the various bins, it was assumed that the first bin interrogated was filled with ore to a level of 9 feet, and level relay and memory relay L9 and M9, respectively, were energized. If each of the next five bins interrogated have an ore level greater than 9 feet, no change will be made in the level and memory relays. If, however, bin location 7 is found to have an ore level of, for example, 5 feet, level relay L5 and memory relay M5 will be energized, as described.

As the program drum 237 operates to sequentially interrogate the various bin locations by reversing contacts 237–1 through 237–15, at the same time an array of contacts 237–16 through 237–30 are also being sequentially closed, one at a time, in the "bin relay" array illustrated in FIG. 5C. This bin relay array has relay coils B1 through B15, one for each bin location, which are energized as their corresponding locations are being interrogated. Thus, when bin 1 is interrogated, relay B1 is energized, and so on for the 15 bin locations of the present embodiment. Energization of the relay is effected, for the first bin location, by the closure of contact C9, the energization of coil L9, the closure of contact L9a, and the resultant application of power to line 308, permitting completion of a circuit through relay B1 in FIG. 5C to line 275.

Upon energization of relay B1 upon the interrogation of the first bin location, corresponding contact B1a is closed in the "bin memory" relay array of FIG. 5C, thereby completing a circuit from line 275 through the now closed contact B1a and its corresponding bin memory relay R1 to line 196, thereby energizing relay R1. R1 then closes its corresponding contact R1a to seal itself in. Relay R1 does not have a b contact, since it is the first one in the array, but it will be noted that each of the remaining relays R2 through R15 include such contacts. These b contacts serve to deenergize the preceding relay as the interrogation proceeds from one bin location to the next. Thus, when relay R2 becomes energized, it will open normally closed contact R2B, breaking the sealing circuit for relay R1 and permitting R1 to become deenergized.

Energization of relay coil R1 also closes its interlock contact R1c connected in series with the corresponding first contact in deck D of the stepper switch 204. Finally, contact R1d is connected in series with a corresponding one of contacts 237–31 through 237–45 in a "tripper locate" array, which contacts are sequentially operable by the program drum 237. Thus, contact R1d is in series with normally open contact 237–31, representing the first bin location, while R15d is in series with normally open contact 237–45.

Since it was postulated that initially the first bin location would have an ore level of 9 feet, the "bin level" and "level memory" relays have been appropriately energized at L9 and M9, as has been explained, and the bin and bin memory relays B1 and R1 have been energized and sealed in. In the example given above, it was further assumed that the next five bin locations interrogated had a higher ore level than that of bin number 1, and this being the case level relay L9 remained energized because of the interlock M9b which prevented relays L10 through L15 from being affected. Although L9 became deenergized upon opening of cam contact C9, the holding circuit in the level memory relay M9 maintained the interlock and prevented additional energization of the level relays. Thus, open contact M9b prevented the closure of any contact C10 through C15 from establishing a complete circuit to line 308, and thus prevented the energization of any of the next five bin relays B2 through B6. If, however, bin location 7 has an ore level of only 5 feet, the closure of cam contact C5, by reason of the position of cam shaft 300, will permit energization of level relay L5, resulting in closure of contact L5a and the application of a voltage to line 308. Drum 237 will have closed contact 237-22 at this time, and thus relay B7 can be energized to close contact B7a and, in turn, energize bin memory relay R7. R7 closes its sealing contact R7a and opens its interlock contact R7b to deenergize memory relay R1. Contacts R7c and R7d (FIG. 5B) also close. Level relay L5 closes its contact L5b in the level memory relay array, energizing memory relay M5 which seals itself in and opens its interlock contact M5c to deenergize the previously energized coil M9. Interlock contact M5b in the level relay array also opens to prevent energization of level relay coils L6 through L15. Upon further rotation of cam shaft 300, contact C5 opens to deenergize L5, remove the signal from line 308, and leave the bin memory and level memory relays in the condition described. If it is assumed that the remaining bin locations contain a greater depth of ore, then the system will indicate that bin location 7 is lowest in ore and contains ore to the depth of about 5 feet. The program drum 237 may now operate to start the tripper in the proper direction toward the selected low bin.

TRIPPER DIRECTION SELECTION

Having selected the bin to which the tripper is to move, the control system must determine whether the tripper is over the low bin, whether the low bin is to the north of the tripper location or whether the low bin is to the south of the present tripper location. This determination is made by means of the stepper switch and related switch arrays of FIG. 5B, to which reference is now made.

It will be remembered that one contact on each of the decks 205, 206, 207 and 208 of bidirectional stepper switch 204 will always be closed, and this closed contact will, after synchronization, correspond to the bin over which the tripper is located. It was also noted above that at the beginning of operation, synchronization of the system is accomplished at the southernmost location, which has been selected as being bin location 15; thus, the tripper is now assumed to be located at this bin.

Referring to deck C of the stepper switch, it will be seen that each of its contacts 1 through 15 are connected in series with corresponding contacts 237-46 through 237-60 of the program drum. All of these corresponding series contacts are connected in parallel between power line 324 and power line 325, line 324 being connected by way of the synchronizing relay contact 225g to power input line 185, and line 325 being connected by way of a control relay 326 to power line 196. When the program drum closes contact 237-60, a circuit is completed from line 324 through contact 15 of deck C of the stepper motor, contact 237-60, line 325 and coil 326. This energizes coil 326 to close its sealing contact 326a, whereby it is connected directly across power supply lines 275 and 196.

It will be noted that a red warning lamp 327 is connected across lines 196 and 275 and thus is energized upon closure of contacts 237d and 237e by the program drum at the start of the cycle. This lamp tells the tripper operator that the program drum is operating to determine bin level preparatory to repositioning the tripper. This red lamp provides warning against manual movement of the tripper by the operator during this period of time.

When contact 326b closes, the series arrangements of the d contact of the bin memory relays R and the corresponding program drum contacts 237-31 through 237-45 in the "-tripper locate" array are connected to the power line 275. These series contacts (i.e., R1d and 237-31; R2d and 237-32, etc.) are connected in parallel between line 275 and an output line 328, and serve to determine the location of the low bin in relation to the present tripper position; that is, whether the low bin is north or south of the tripper.

LOW BIN NORTH

Since, in this example, the tripper is over bin 15, and the low bin to which the tripper is to move is number 7, it will be seen that the tripper must move north. As the drum 237 moves, its contacts 237-31 through 237-36 will close without producing a closed circuit through any Rd interlock, for the tripper is at bin 15, control relay coil 326 has not yet been energized, and thus contact 326b remains open. Thus, here will be no power available on line 328. When contacts 237-45 and 237-60 are both closed, however, a circuit will be completed through deck C to energize relay 326 and close 326b. This operation occurs too late to provide power on line 328, because no circuit can be completed through contacts R7d and 237-45. After these last contacts on the program drum have closed and then reopened, normally open contacts 237o and 237p in circuit with the direction relays 195 and 242 will close in sequence. When contact 237o closes, power is supplied from line 275 by way of a normally closed contact (332b) to be described and a normally closed interlock contact 195f to the north direction relay coil 242. Energization of coil 242 opens an interlock contact 242d in series with the south direction relay coil 195 to prevent its energization when contact 237p is closed by the program drum. The circuit from coil 242 is completed through a normally closed contact to line 196. Contact 242a will close in the north stepper motor circuit of FIG. 5A, interlock contact 242b will isolate the south stepper motor 200, contact 242c will open in the power on relay (182) circuit, a contact 242e will close to provide power from phase B through the now closed contacts 170b and 182a to line 172 which enters conduit 174, leading to the remote reversing contactor of FIG. 8. As seen there, line 172 leads through the south run interlock contact 152a to apply power to the north run relay coil 154, closing contacts 154b (FIG. 9) to provide power to the tripper to start it moving in the north direction. As the tripper passes indexing actuators, the stepping switch 204 will follow it, shifting the decks sequentially toward the desired tripper location. When contact 7 of deck D is closed, the tripper will be at desired location, and must be stopped.

Deck D of the stepper switch 204 is associated with the c contacts of the "bin memory" relays of FIG. 5C, and as has been described, contact R7c will be closed since this corresponds to bin 7, where the least amount of ore was found. When the tripper encounters the actuator for bin 7, the stepper motor advances deck D to close its contact 7 and thus completes a circuit from power supply line 275 through the deck D contact 7, the now closed contact R7c to a line 330 which leads to relay coil 331. The other side of coil 331 is connected to power supply line 196. Coil 331 is thus energized and opens its contacts 331a, breaking the circuit through the north direction relay coil 242 and dropping out all of its contacts. Power is then removed from the south run relay coil 154, power is removed from the tripper and the tripper stops over bin 7, remaining there until moved manually or by console control.

After a proper interval of time, the program drum contacts will open to remove power from the bin level location determination system and all these circuits will be reset for the next cycle.

LOW BIN SAME

In the next cycle of bin interrogation, which interrogation takes place as described hereinabove, if the memory relays indicate that the new low bin is the same as previously determined; i.e., the low bin is number 7, over which the tripper is now positioned, the operation will be as follows. Program drum contacts 237-31 through 237-45 and 237-46 through 237-60 will start closing sequentially as before. When the contacts corresponding to the location 7 are reached, coil 326 will be energized (from deck C) and will seal itself in. This closes contact 326b and establishes a circuit through R7d and 237-37, thereby applying power to line 328. This permits energization of coil 332 which seals itself in by way of series contact 332a. Corresponding contact 332b in series with the north direction relay coil 242 is opened, preventing energization of the north direction coil.

As before, contact 237o is closed after the program drum has closed and opened contacts 237-45 and 237-60, but this will not energize relay 242. After a short interval contact 237p closes. Normally, the closing of this last contact would result in energization of the south direction relay coil 195, but in this situation, where the tripper is positioned over the low bin, contact 7 on deck D is closed, as is its series contact R7c, which relates to the location of the low bin. By reason of this, coil 331 is energized, opening its contact 331a and preventing the directional relays 195 and 242 from being energized. Since both the north and south direction relays are thus deactivated, the tripper will not move.

LOW BIN SOUTH

The situations where the tripper is to move north or is to remain stationary in order to be positioned over the low bin having been discussed, there remains only the situation where the tripper is to move south. For this purpose, it will be assumed, for example, that the tripper is positioned over bin No. 5, with the low bin to which it is to be moved being location No. 7, to the south. As the program drum 237 closes its contacts 237-31 through 237-45 in sequence and at the same time its contacts 237-46 through 237-60, a circuit will be completed to coil 326 when the program drum contacts corresponding to position 5 of deck C are closed; that is, when contacts 237-50 close. Relay 326 seals itself in and closes contacts 326b. As the program drum continues to step, contact 237-37 will close and complete a circuit through the selected contact R7d, thereby energizing coil 332. Coil 332 now seals itself in and opens contact 332b in the north direction relay 242 circuit, preventing energization of this relay.

After contacts 237-45 and 237-60 are closed and opened the program drum then closes 237o and 237p sequentially. The closure of 237o does not energize coil 242 because contact 332b is open, but closure of 237p applies power from line 275 through normally closed interlock contact 242d to the south direction coil 195, thence through contact 331a to power line 196. Contact 331a remains closed because contact 5 of deck D is closed (to correspond to the actual tripper location), while contact R7c, representing the desired location of the tripper, is closed, thus preventing energization of coil 331. Energization of relay 195 will energize the tripper to run in the south direction, in the manner hereinbefore described. When deck D has been stepped to contact 7 by motion of the tripper, coil 331 is energized to open contact 331a and stop the tripper.

From the foregoing, it will be seen that the tripper can be controlled by the console to periodically seek the bin having the lowest level of ore. A timer mechanism regulates the intervals at which the system senses the various bin levels and the tripper automatically moves to the selected bin. As this bins gradually fill, the amount of time between successive cycles decreases so that the interrogation of bins occurs more frequently. This causes the tripper to remain for a shorter length of time over a selected bin to thereby reduce the possibility of bin overflow during one of the intervals. When the shortened interval between cycles is not sufficient to permit the control system to move the tripper from one bin to another selected bin before an overflow occurs, the overflow will take the tripper off automatic console control and place it on self-control traverse operation, whereby the tripper will seek the first bin that is not full, and stop there until it fills. The tripper will then move a predetermined distance to seek a new bin location that is not full, and will continue to move periodically in this way. If all the bins become so full that ore is prevented from flowing out of the tripper chutes, this will be sensed as a choke condition and the system will come to a stop.

REMOTE MANUAL CONTROL

In addition to the self control features of the tripper and the automatic program control described above, the system is also adapted for manual repositioning of the tripper from the remote console. This may be accomplished without loss of synchronization between the stepping switch in the control console and the tripper position so that the system will continue on automatic operation after the manual repositioning has been accomplished. Manual operation from the control console is also possible with the present system when the tripper is not under the program mode of control. This remote manual repositioning is accomplished with conventional push buttons indicated in FIG. 5A generally at 340. For this operation, the control switch 150 on the remote reversing contactor of FIG. 8 must be in the "auto" position as must be selector switch 107 in the tripper of FIG. 7. With the tripper set up for automatic operation and synchronized with the control, the operator may then manually position the tripper to deposit material in certain bin areas, either before the tripper has been placed on program control, and before the control is synchronized with the tripper, or after the tripper is on program control. In this latter situation, the operator may interrupt the program temporarily without breaking the control function.

If it is assumed that the tripper has not yet been placed under the control of the program drum, and the pushbutton start switch 180 has not yet been depressed to activate the control system, it will be seen that normally closed contacts 182c, 182d and 182g in FIG. 5A will remain in their closed position, since coil 182 remains deenergized. Similarly, since the program drum is not yet operative, its contact 237q in series with switches 340 is also closed to connect the pushbutton switches to line 186, but this line carries no power at this time since contact 182f is normally open and prevents control power from reaching line 186. Switch 340 includes a north button 341 and a south button 342, each push button having a pair of simultaneously operated contacts. One side of the upper contact of south button 342 is connected by way of line 343 through normally closed contact 182g to the phase B power supply line 106. Similarly, one of the upper contacts of north button 341 is connected by way of line 344 to line 343 and thence to the power supply line. Closure of the south button connects power from line 343 to line 345 which is connected by way of normally closed contact 182d and line 188 to line 173 which leads, by way of conduit 174, to the remote contactor. Line 345 is also connected in FIG. 5B through normally closed contact 242d to the south direction relay coil 195, whereby closure of contact 342 will energize coil 195.

The upper contact of north button 341, when closed, connects line 344 to line 346 (FIG. 5A) which is connected, by way of normally closed contact 182c, to line 172 and thence through conduit 174 to the remote reversing contactor. Line 346 is also connected, in FIG. 5B, through normally closed contacts 332b and 195f to the north direction relay coil 242.

One terminal of each of the lower contacts of switches 341 and 342 is connected through line 237q to power supply line 186, while the remaining contact terminals of these two switches are connected by way of line 347 to direction relay coils 195 and 242 (FIG. 5B).

Before the tripper is on program control, it will be energized for automatic operation by depressing push button 95 (FIG. 7), thereby latching relay 144', closing contact 144b and thereby providing power through the normally closed contacts 96, through interlock contacts 109b and N run relay 108. Relay coil 108 will close its corresponding contactors 108c to prepare the tripper to move when power is available from the remote reversing contactor of FIG. 8. To move the tripper in a north direction, then, the operator will depress the N push button 341 (FIG. 5A). Phase B power from line 106 will then be available through lines 343 and 344 to line 346. Power is then supplied by way of line 172 through conduit 174 to the N run relay coil 154 in the remote reversing contactor (FIG. 8).

This then energizes contacts 154b in FIG. 9 and provides appropriately phased power to the tripper motor to cause it to run in the north direction. The tripper will continue to travel north as long as the N push button is depressed, and thus the tripper can immediately be stepped by releasing the push button.

To move the tripper south, the S button 342 is depressed, thereby connecting phase B power from line 106 through line 343 and 345 to line 173. This line is connected through conduit 174 to the S run relay coil 152 (FIG. 8) which, when energized, operates its contacts 152b to energize the tripper and cause it to operate in the south direction. Again, the tripper will run as long as the button is depressed.

If it is assumed that the tripper is on program control, contacts 182c, 182d and 182g will be open, while contacts 182b and 182f in the power supply lines 185 and 178, respectively, and contacts 182h (in series with line 185 and push button switch 340) will be closed. Contact 237q will be open only during the short portion of the program cycle during which the program drum 237 is determining the location of the low bin and moving the tripper to it. When the tripper has reached the new location, contact 237q will close and the program cycle controls will be reset for the next cycle. During this interim period, the pushbutton switch 340 becomes operable by reason of control power supplied through line 185 and contact 182h and from line 186 through contact 237q. It will be apparent that contact 237q prevents operation of the pushbutton 340 during a programming cycle. Under the condition of program control, when the N button 341 is depressed, control power from line 186 is transferred through the pushbutton through the lower contacts of the pushbutton to line 347, which is common to both the north direction relay coil 242 and the south direction relay coil 195. The upper contacts of north button 341 connect control power from line 185 through contact 182h to line 346, thence to the north direction relay 242, permitting its energization, and closing its contacts 242a in the north stepper motor circuit and opening 242b in the south stepper motor circuit. Contact 242c opens in the "power on" circuit of relay 182 and contact 242e closes to put phase B power from line 106 through now closed contacts 170b and 182a to line 172, thereby energizing the N run relay in the remote reversing contactor, as has been described. The tripper will then remove in a north direction, but the console control will remain, so that a pulse will reach the north stepper motor each time an indexing point is passed, thereby causing the stepping switch to remain synchronized with the tripper location. In addition, the indicating lights of deck B will provide a continuous indication of tripper location.

To manually relocate the tripper in a south direction, the S button 342 is depressed, thereby providing control power from line 185, through now closed contact 182h, line 344 and the upper contacts of button 342 to line 345. This applies control power to the S direction coil 195 and causes the tripper to run in a south direction. At the same time, contact 195c closes in the south stepper motor circuit and contact 195d opens in the north stepper motor circuit. Contact 195a applies phase B power to line 173 and thus energizes the S run relay 152 in the remote reversing contactor. Again, during this operation, a pulse will be applied to the south stepper motor each time the tripper proximity switch passes an indexing bar, whereby the stepping switch remains synchronized with the tripper location.

In the event it is desired to operate for an extended period of time by the mode just described, a selector switch 350 may be provided in series with the variable speed program timer to disable the program drum. This prevents the cycling that would cause contact 237q to open periodically, and permits remote manual operation indefinitely. Contact 350 is shown on the control panel of FIG. 11 as being switchable from a program (PROG.) to a manual ("(MAN.) to enable the operator to select the mode of operation. Thus, manual operation can be attained without losing synchronism with the console, thereby providing remote indication of the tripper location. Shifting switch 350 to the manual position opens its contacts (illustrated in FIG. 5A in series with the timer motor 235), while shifting it to the program position closes these contacts and places the system back on its programmed operation.

Thus, there has been described an efficient, easily maintained automatic system for conveying and storing ore or similar materials in an elongate pile, preferably in a plurality of bins or bin locations. The system includes a control for operating the tripper and the conveyor to fill a selected bin wherein the ore level is determined to be below that of any other bin in the system. The system further includes an emergency alarm and means for shifting the system to autonomous, or self control, upon the occurrence of certain types of emergency situations. Also includes are means for manually causing the tripper to traverse between two established stations over the bins, whereby discharge is equal in all the bins between the stations. Finally, means are provided for remotely repositioning the tripper at any desired location, whether the tripper is under program control or on standby status. Numerous variations and modifications of the system will be apparent to those skilled in the art. For example, although the system is shown in terms of mechanical switches and relays, it will be apparent that solid state devices may be substituted in the known manner. Thus, the system described is merely illustrative of the true scope and spirit of the inventive concept.

I claim:

1. In a remote automatic control system for a conveying and storage apparatus having conveyor means, a traveling tripper for unloading said conveyor, a plurality of bin locations located along at least a portion of the length of said conveyor, drive means for causing said tripper to move along said conveyor to discharge material from said conveyor into said bin locations, and automatic program control means remote from said tripper for regulating the motion of said tripper, the improvement comprising:

- interrogating means in said program control means for periodically determining which bin location contains the least amount of material;
- memory means for registering in said program control means the location of the bin having least material; and
- means for automatically moving said tripper over the bin location so registered, whereby the low bin location is selected and filled.

2. The automatic tripper control system of claim 1, wherein said interrogating means includes timing means for regulating the interval between successive interrogations, said tripper being moved to the low bin location after each such interrogation.

3. The automatic tripper control system of claim 2, further including means for varying said timing means to change said interval during normal operation of said system.

4. The automatic tripper control system of claim 3, further including means for accumulating a signal proportional to the number of times said tripper is moved to a low bin location, and means responsive to said accumulated signal to gradually decrease the interval between interrogations during operation of said tripper, whereby as the bin locations gradually fill, the depth of material in each bin is more frequently interrogated, and said tripper is more frequently caused to move to a low bin location.

5. The automatic tripper control system of claim 2, wherein said interrogating means includes a balanced bridge circuit, means for sensing the level of material in a bin location, means for unbalancing said bridge circuit in accordance with the sensed level, means for rebalancing said bridge circuit, and second memory means responsive to said means for rebalancing for registering in said program control means the sensed bin level.

6. The automatic tripper control system of claim 5, wherein said interrogating means includes programmed switching means for successively connecting the sensing means of each bin location to said bridge circuit.

7. The automatic tripper control system of claim 6, wherein said memory means for registering the location of the low bin includes said programmed switching means, said memory means comprising means for registering the bin location being interrogated, and means for retaining in said memory means only the location of the bin having the lowest level of material.

8. The automatic tripper control system of claim 6, said interrogating means further including tripper location switching means for synchronizing said control system with the actual location of said tripper.

9. The automatic tripper control system of claim 8, wherein said means for moving said tripper to the registered low bin location includes direction control means responsive to the relative indications of said tripper location switching means and said memory means for registering the location of said low bin.

10. The automatic tripper control system of claim 9, further including override means in said program control means for manual relocation of said tripper away from the low bin location, said override means being operable while retaining synchronism between said location switching means and said actual tripper location.

11. The automatic tripper control system of claim 9, further including emergency control means on said tripper; and means for disabling said automatic program control means and enabling said emergency control means upon occurrence of an emergency condition.

12. The system of claim 1, further including tripper control circuit means on said tripper and actuator means located at selected points along said conveyor; said tripper control circuit including manual means for disabling said remote automatic program control and means responsive to said actuator means for causing said tripper to traverse continually between said actuator means.

13. The system of claim 12, said tripper control circuit means further including autonomous control means and automatic means for disabling said remote automatic program control circuit and energizing said autonomous control means upon occurrence of an emergency.

14. The system of claim 13, wherein said autonomous control means includes timer means for causing said tripper to move a predetermined distance, and stop, while discharging said material; means for sensing the level of material at the bin location where said tripper is stopped; and means responsive to a full bin to energize said timer means to again move said tripper said predetermined distance.

15. The system of claim 1, wherein said interrogating means includes sensing means at each bin location for measuring the level of material in the corresponding bin, indicator means responsive to said sensing means for displaying the level of material in each bin, and programmed switching means for sequentially connecting each said sensing means to low bin determination means, whereby the low bin location is registered in said memory means.

16. The system of claim 1, said automatic program control means including stepper means having a plurality of positions corresponding to said plurality of bin locations, means responsive to energization of said program control means to drive said tripper to its furthest extent of travel in one direction and to drive said stepper means to a corresponding position, whereby said stepper is synchronized with said tripper, and means for thereafter periodically driving said stepper in accordance with the motion of said tripper to maintain synchronization.

17. The system of claim 16, said automatic program control means further including low bin determination means and means for registering the location of said low bin in said memory means, and programmed switching means for causing said tripper to move to the location of said low bin.

18. The system of claim 17, said low bin determination means comprising sensing means for each of said bin locations, said programmed switching means further including means for sequentially interrogating said sensing means, bridge circuit means responsive to each of said sensing means in turn, means for rebalancing said bridge in accordance with the sensed level of material at each bin location, and means corresponding to the rebalancing of said bridge for registering the location of the low bin in said memory means.

19. The system of claim 18, said programmed switching means further including means for comparing the actual location of said tripper as indicated by said stepper means with the low bin location registered in said memory means, and direction control means responsive to said means for comparing for moving said tripper toward the low bin location.